United States Patent [19]
Takahashi et al.

[11] Patent Number: 5,608,424
[45] Date of Patent: Mar. 4, 1997

[54] MOVING PICTURE DISPLAY APPARATUS AND EXTERNAL MEMORY USED THEREFOR

[75] Inventors: Toyofumi Takahashi; Michitaka Miyoshi, both of Tokyo; Masahiro Otake; Satoshi Nishiumi, both of Kyoto, all of Japan

[73] Assignees: Nintendo Co., Ltd., Kyoto; Ricoh Co., Ltd, Tokyo, both of Japan

[21] Appl. No.: 140,478

[22] Filed: Oct. 25, 1993

Related U.S. Application Data

[63] Continuation of Ser. No. 778,997, Nov. 14, 1991, abandoned.

[30] Foreign Application Priority Data

| Feb. 5, 1990 | [JP] | Japan | 2-25737 |
| Jul. 31, 1990 | [JP] | Japan | 2-205747 |
| Jul. 31, 1990 | [JP] | Japan | 2-205748 |
| Feb. 4, 1991 | [WO] | WIPO | PCT/JP91/00130 |

[51] Int. Cl.$^6$ .................................................. G09G 5/22
[52] U.S. Cl. ........................... 345/141; 345/185; 345/122
[58] Field of Search .................................. 345/121, 127, 345/190, 193, 200, 185; 395/141; 382/44–47

[56] References Cited

U.S. PATENT DOCUMENTS 4,425,559  1/1984  Sherman ................. 395/141

*Primary Examiner*—Mark R. Powell
*Assistant Examiner*—Matthew Luu
*Attorney, Agent, or Firm*—Nixon & Vanderhye P.C.

[57] ABSTRACT

A moving picture display apparatus comprises a main body and an external memory detachably mounted on the main body. The main body of the moving picture display apparatus is provided with a video data memory for storing therein graphic data of characters which constitute objects. A program data memory of the external memory has object data of an object to be displayed on a raster-scan type monitor, i.e., color pallet data, object name data, vertical position data, horizontal position data, object size selection data and size designation data and etc., all of which have previously been stored therein. Object data of an object to be displayed during the next vertical period is read from the program data memory so as to be stored in an object attribute memory. An inrange detection circuit makes a decision as to whether or not an object is in an inrange state, based on the vertical position data, the size selection data and the size designation data, and also makes a decision as to whether or not the object is in the inrange state, based on the horizontal position data, the size selection data and the size designation data.

14 Claims, 22 Drawing Sheets

F I G. 1
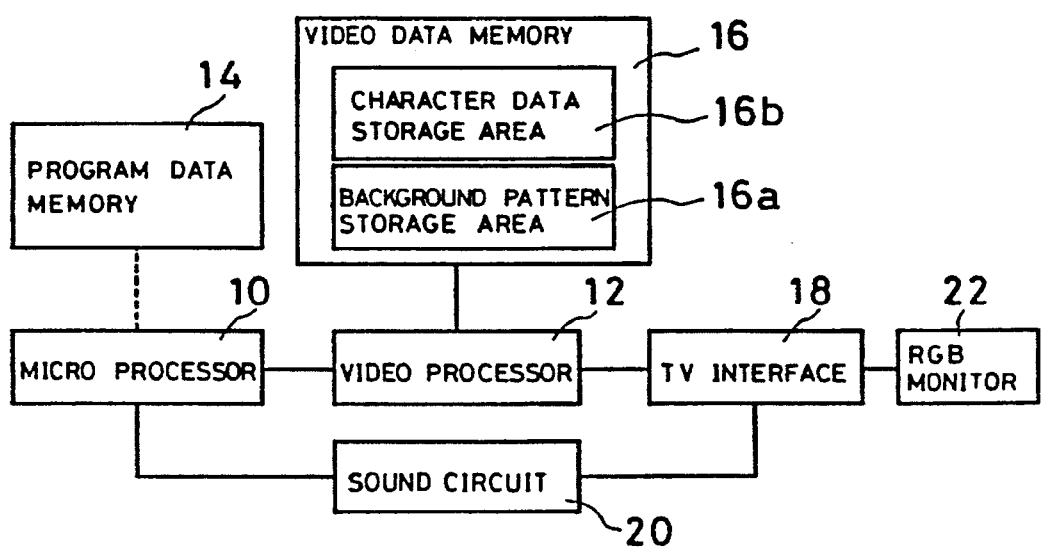
F I G. 2
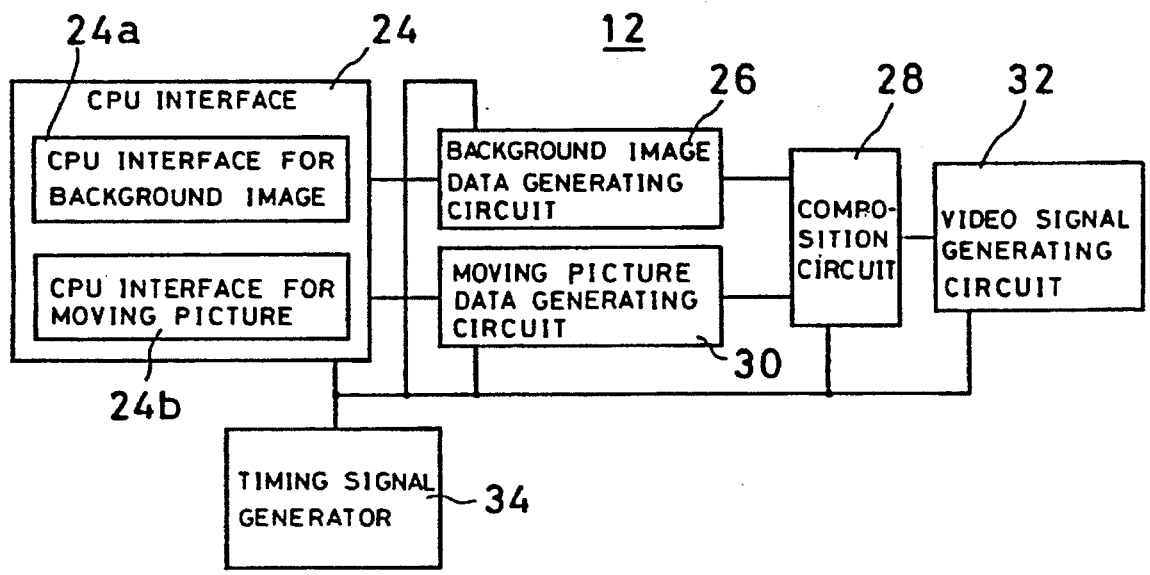

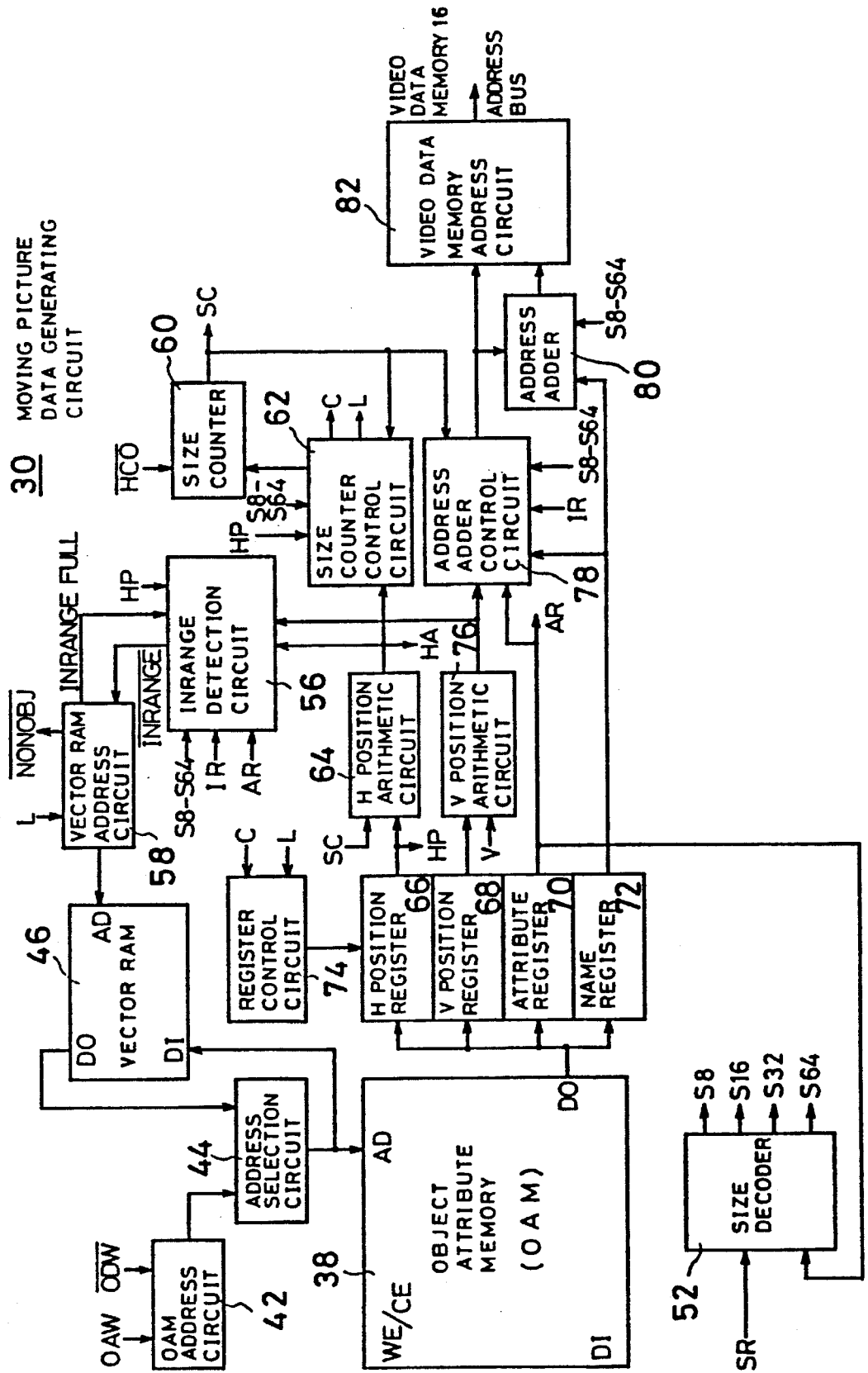

F I G. 12
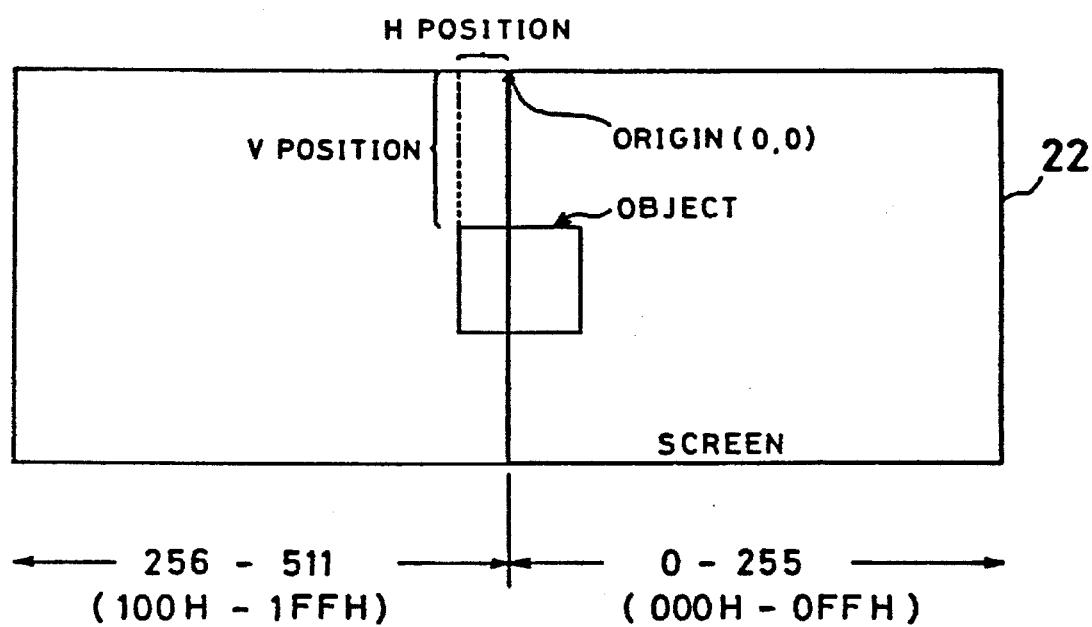

F I G. 15
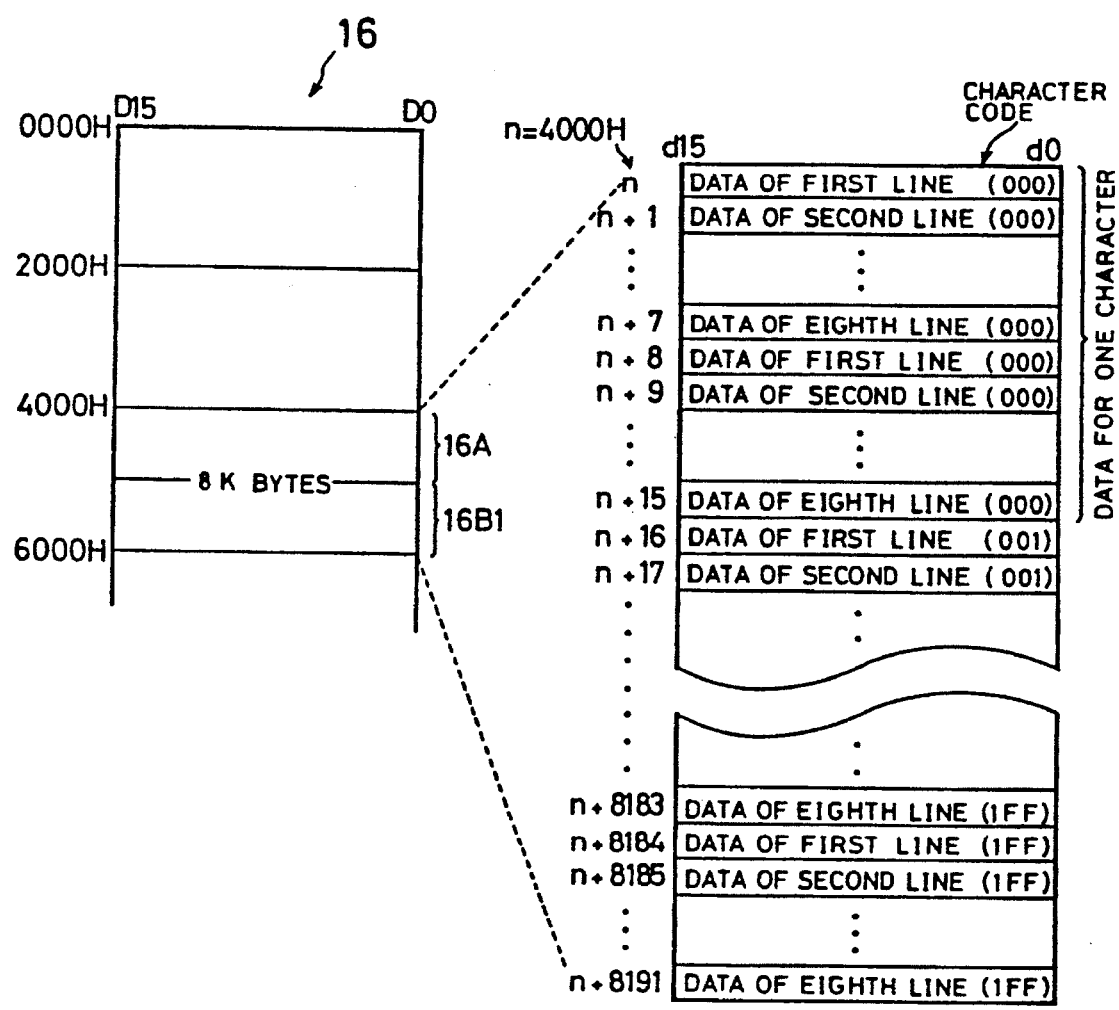

F I G. 18A
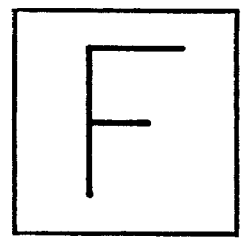
H-FLIP = 0
V-FLIP = 0
F I G. 18B
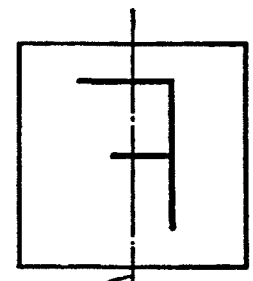
310
H-FLIP=1, V-FLIP=0
F I G. 18C
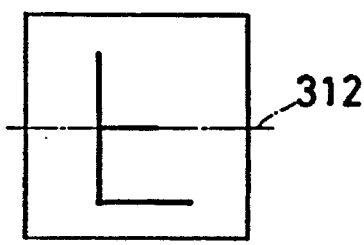
312
H-FLIP = 0
V-FLIP = 1
F I G. 18D
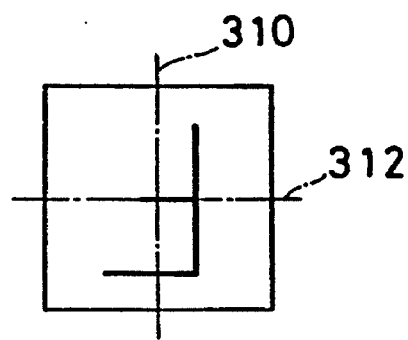
310
312
H-FLIP=1, V-FLIP=1

F I G. 20
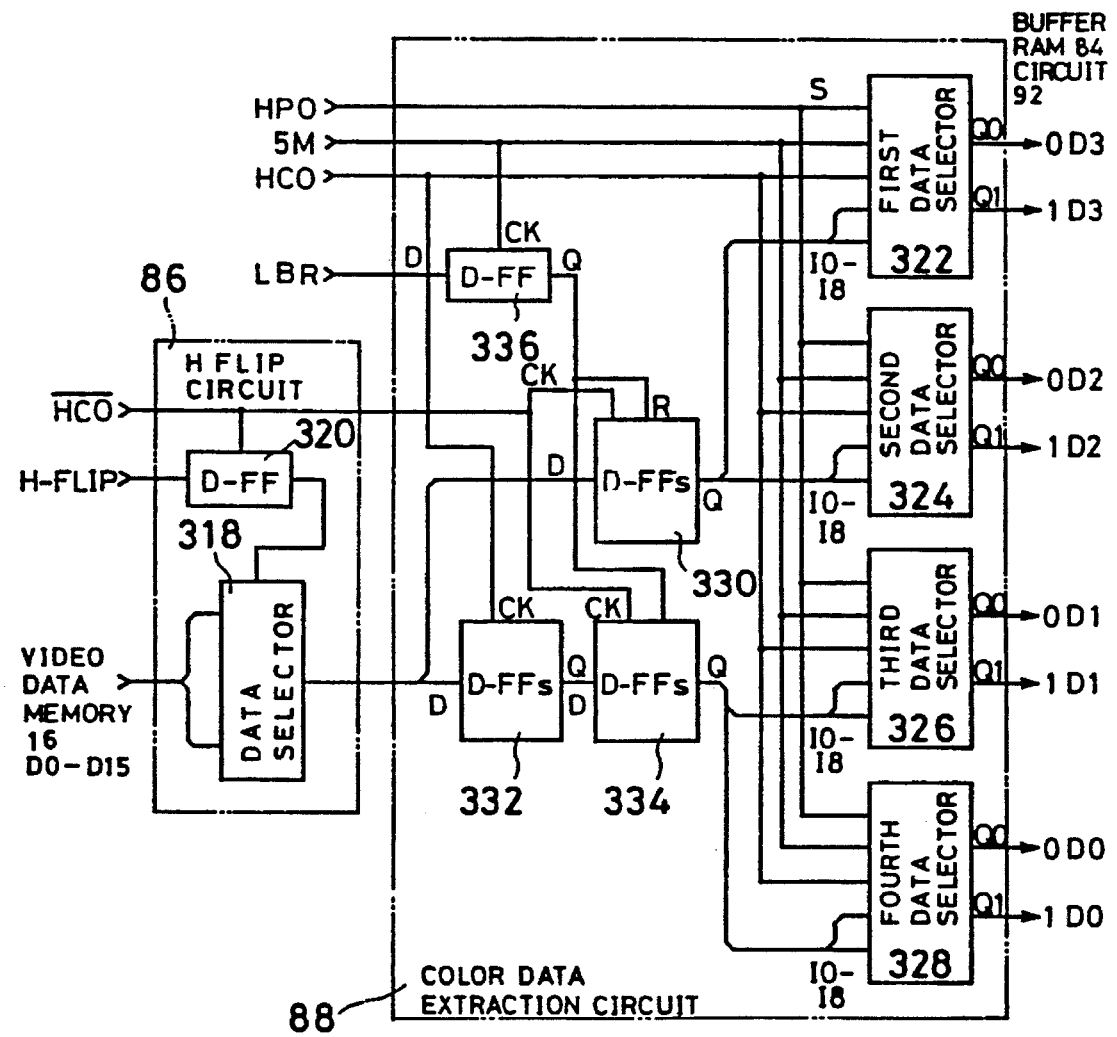

MOVING PICTURE DISPLAY APPARATUS AND EXTERNAL MEMORY USED THEREFOR

This is a continuation of application Ser. No. 07/778,997, filed Nov. 14, 1991, now abandoned.

FIELD OF THE INVENTION

The present invention relates to a moving picture display apparatus and an external memory suitable for use therein. More particularly, the present invention relates to a moving picture display apparatus such as a video game machine, a personal computer, for animatedly displaying a large-sized object on a raster-scan type monitor by combining one or more characters each comprising a plurality of dots in horizontal and vertical directions respectively, and to an external memory suitable for use in the moving picture display apparatus.

PRIOR ART

There is known a moving picture display apparatus such as a "Family Computer (trade name)", a "Nintendo Entertainment System (trade name)", etc., which has been disclosed in Japanese Patent Application Laid-Open No. 59-118184 (corresponding to U.S. Pat. No. 4,824,106) laid open on Jul. 7, 1984. The disclosure comprises a first memory for storing therein data of an object (character) corresponding to one screen, a second memory for storing therein only data of an object to be displayed during the next horizontal scanning period, and a plurality of shift registers each used to store therein dot data (graphic data) of one object. The disclosed moving picture display apparatus outputs horizontal and vertical position data, object codes and attribute data for each object. In addition, it compares a vertical display position of an object and a horizontal scanning-line number on a monitor so as to make a decision, such as a so-called "inrange detection" as to whether or not the object should be displayed during the next horizontal scanning period. Then, the moving picture display apparatus is activated to carry out an inrange decision on the object for each object so that graphic data of an object subjected to the decision of it being in the inrange state is transferred from the first memory to the second memory, thereby transmitting the graphic data to a corresponding shift register during the horizontal blanking period.

In the disclosed moving picture display apparatus, the graphic data of the object subjected to the decision of it being in the inrange state during the horizontal blanking period is transferred to the shift register. Therefore, the processing speed is much faster than that which can be realized by the conventional video game machine. However, when it is desired to display a large-sized object by the moving picture display apparatus, a load imposed on a CPU (microprocessor) is increased, and an OAM (Object Attribute Memory) having large capacity is necessary. More specifically, one object is represented in the form of data of 4 bytes in the prior art. It is therefore necessary to rewrite or reload a large-sized object comprising a group of N characters into data of 4byte×N in each of the first and second memories in order to display such an object. Thus, when the large-sized object is displayed, the load imposed on the CPU (microprocessor) is increased, thereby exerting an influence on other arithmetic processing, etc. Therefore, the size of each of objects and the number of the objects are restricted when it is desired to display an object in the range at which the increase in the load referred to above does not exert the influence on such arithmetic processing. In addition, object data of all the characters of the object, i.e., data about horizontal and vertical positions, color codes and attribute data must be stored in the OAM, thereby making it necessary to increase the storage capacity of the OAM.

Contrary to the above prior art, there has been proposed an image processing apparatus capable of displaying a large-sized object, which is disclosed in, for example, Japanese Patent Application Laid-Open No. 62-24296 laid open on Feb. 2, 1987. According to the disclosure, data of horizontal and vertical display sizes are stored in an attribute memory (corresponding to the OAM referred to above). In addition, the vertical display size data is used for the inrange detection and the horizontal display size data is employed as a read address for a character RAM. Thus, the disclosure can bring about an advantage in that the size of an object can arbitrarily be changed for each object.

In the image processing apparatus disclosed in Japanese Patent Application Laid-Open No. 62-24296, however, the horizontal display size data is not used for the inrange decision and hence data of all the objects subjected to the decision of being in an inrange state by the vertical display size data are electrically processed in the same manner as the disclosure of Japanese Patent Application Laid-Open No. 59-118184. Specifically, even when an object to be detected lies beyond both ends of the screen of a monitor, it is determined that the object is in the inrange state in spite of the fact that the object is not to be normally displayed on the screen if the inrange decision is executed only by the vertical display size data. In other words, even an object lying over the range at which it can be displayed in the horizontal direction on the screen of the monitor, is subjected to a process for converting object data into graphic data. On the other hand, the time required to carry out such a conversion process is kept constant, thereby causing a problem in that the number of objects capable of being displayed by one horizontal line is substantially reduced. In order to solve such a problem, a CPU (microprocessor) makes it necessary to carry out a process for avoiding a decision as to whether or not the object lying over the object display range is in the inrange state. Thus, the load or burden imposed on the CPU is not fully reduced.

SUMMARY OF THE INVENTION

In view of the foregoing problem, it is therefore a principal object of the present invention to provide a novel moving picture display apparatus and an external memory suitable for use in the apparatus.

It is another object of the present invention to provide a moving picture display apparatus capable of displaying the maximum number of objects without reducing the number of objects displayable in the horizontal-direction.

It is a further object of the present invention to provide a moving picture display apparatus capable of greatly reducing any load imposed on a CPU (microprocessor) when a large-sized object is displayed.

It is a still further object of the present invention to provide a moving picture display apparatus capable of displaying a large-sized object using an animation attribute memory having small storage capacity.

It is a still further object of the present invention to provide a moving picture display apparatus capable of displaying each of objects of various different sizes by making use of a memory having small storage capacity.

It is a still further object of the present invention to provide a moving picture display apparatus capable of increasing the number of objects displayable using a memory having small storage capacity.

It is a still further object of the present invention to provide a moving picture display apparatus capable of reducing any load imposed on a processor for performing an animation process.

It is a still further object of the present invention to provide a moving picture display apparatus of a type wherein when some or all of an object lies over the range of the screen, data processing of the over-ranged portion is inhibited so as to reliably eliminate inefficient data processing, thereby making it possible to substantially reduce the number of objects.

It is a still further object of the present invention to provide an external memory employed in each of the above-described moving picture display apparatuses.

According to one aspect of a first invention, there is provided a moving picture display apparatus of a type wherein a large-sized object can be displayed on a raster-scan type monitor by combining one or more characters each comprising a plurality of dots in horizontal and vertical directions respectively, the moving picture display apparatus comprising: first storing means for previously storing graphic data of characters constituting an object in a corresponding address region for each object; object designation data generating means for generating object designation data used to designate at least one object to be displayed on the monitor during the next vertical scanning period on the monitor; position data generating means for generating position data used to represent horizontal and vertical positions of the designated object on the monitor on which the designated object is to be displayed; size selection data generating means for generating size selection data used to select one of object sizes; second storing means for temporarily storing the object designation data and the position data therein; inrange detecting means for making a decision as to whether or not the object should be displayed on the monitor during the next horizontal scanning period, based on the vertical position data outputted from the second storing means and the size selection data outputted from the size selection data generating means, and for making a decision as to whether or not the object should be displayed on the monitor during the next horizontal scanning period, based on the horizontal position data outputted from the second storing means and the size selection data outputted from the size selection data generating means; and read address creating means for creating a read address for the first storing means with respect to an object subjected to the decision of the object being in an inrange state by the inrange detecting means, based on the object designation data, the position data and the size selection data, thereby applying the so-created read address to the first storing means.

Incidentally, when the first invention is applied to an external memory, the external memory is provided with the object designation data generating means, the position data generating means and the size selection data generating means.

For example, one character is represented in the form of 8 dots (pixels) in the horizontal direction×8 dots (pixels) in the vertical direction. One object can be formed by a group or combination of one or more characters. Graphic data (dot data) of one or more characters comprising each of, for example, 128 objects are stored in the first storing means such as a video data memory, etc. for every object in advance. Thus, a desired object can be displayed on the raster-scan type monitor by reading the graphic data from the first storing means.

The microprocessor (CPU) is activated to set object data to the second storing means such as an OAM (Object Attribute Memory), etc. while an initial condition is being established or during the vertical blanking period on the raster-scan type monitor. Such object data include, for example, object designation data (name data), vertical position data, horizontal position data and object size selection data as well as color pallet data, horizontal and vertical flip data and priority display data, etc.

The object size determination data include object size designation data and size selection data, for example. The size designation data is used to designate two of the object sizes, for example, "8×8", "16×16", "32×32" and "64×64". The size selection data is of either "0" or "1", for example. When "0" is set as the size selection data, one of the so-designated two sizes is selected. When "1" is set as the size selection data, the other thereof is chosen. In this way, the object size can be determined by making use of the size determination data.

The inrange detecting means compares a horizontal line number of a raster-scan type monitor and vertical position data of an object, for example and thereafter makes a decision as to whether or not the corresponding object is in an inrange state, i.e., it should be displayed by the next horizontal line, based on the result of its comparison and the object size referred to above. At the same time, the inrange detecting means makes a decision as to whether or not a corresponding object is in an inrange state, based on, for example, the result obtained by performing an arithmetic operation on the absolute value of the horizontal position of the object, and the object size.

Then, graphic data of an object subjected to the determination of it being in an inrange state both in the horizontal and vertical directions by the inrange detecting means is read from the first storing means. More specifically, the read address creating means creates a read address based on object designation data, position data and an object size in such a manner as to read graphic data of an object subjected to the inrange detection from the first storing means.

According to the first invention, the inrange detecting means makes a decision as to whether or not the object is in the inrange state both in the vertical and horizontal directions. Therefore, an object to be actually displayed is only subjected to the inrange detection as compared with the process for making a decision as to whether or not the object is in the inrange state only in the vertical direction as in the disclosure of each of Japanese Patent Application Laid-Open Nos. 59-118184 and 62-24296, thereby making it possible to prevent the number of objects from being substantially reduced. The object subjected to the determination of it being in the inrange state is always displayed, and hence wasteful processing time of the CPU or microprocessor can be eliminated, thereby making it possible to improve the operation efficiency of the microprocessor.

According to one aspect of a second invention, there is provided a moving picture display apparatus of a type wherein a large-sized object can be displayed on a raster-scan type monitor by combining one or more characters each comprising a plurality of dots in horizontal and vertical directions respectively, the moving picture display apparatus comprising: first storing means for previously storing graphic data of characters constituting an object in a corresponding address region for each object; object designation data generating means for generating object designation data used to designate at least one object to be displayed on the monitor during the next vertical scanning period on the monitor; position data generating means for generating position data used to represent positions of the designated object on the monitor on which the designated object is to be displayed; size selection data generating means for selecting an object size for each object; designation mode data generating means for generating designation mode data used to determine a size designation mode for each screen of the monitor; second storing means for temporarily storing the object designation data and the position data therein; inrange detecting means for making a decision as to whether or not the object should be displayed on the monitor during the next horizontal scanning period, based on the combination of position data read from the second storing means, size selection data fed from the size selection data generating means and designation mode data outputted from the designation mode data generating means; and read address creating means for creating a read address for the first storing means with respect to an object subjected to the decision of the object being in an inrange state by the inrange detecting means so as to supply the so-created read address to the first storing means.

When the second invention is applied to an external memory, the external memory is provided with the object designation data generating means, the position data generating means, the size selection data generating means and the designation mode data generating means.

According to the second invention, the inrange detecting means makes a decision as to whether or not a corresponding object is in an inrange state, i.e., it should be displayed by the next horizontal line, based on an object size defined by size designation data and size selection data, and position data of the object on the monitor. In addition, the read address creating means creates a read address based on, for example, object designation data, position data, size designation data and size selection data in such a manner as to read graphic data of the object subjected to the inrange decision from the first storing means.

According to the second invention as well, the size designation data is used to designate a plurality of kinds of sizes and the size selection data is used to select or determine the size of each object. It is therefore possible to greatly reduce the quantity of data used to determine the object size as compared with the conventional example. Accordingly, not only the storage capacity of an OAM can greatly be reduced, but the storage capacity of a program memory can be reduced as well. Let's now assume that 128 objects can be displayed on one screen at the maximum and there are provided six kinds of displayable sizes, for example. In this case, 3-bit size designation data and 1-bit size selection data may be set for each screen and each object respectively. Thus, data of 131 bits (=128×1 +3) may be used to alterably or adjustably determine the sizes of the objects. The quantity of such data may be of about 1/5 (=131/768) as compared with the art disclosed in Japanese Patent Application Laid-Open No. 62-24296.

According to one aspect of a third invention, there is provided a moving picture display apparatus of a type wherein a large-sized object can be displayed on a raster-scan type monitor by combining one or more characters each comprising a plurality of dots in horizontal and vertical directions respectively, the moving picture display apparatus comprising: first storing means for previously storing graphic data of characters constituting an object in a corresponding address region for each object; object designation data generating means for generating object designation data used to designate at least one object to be displayed on the monitor during the next vertical scanning period on the monitor; position data generating means for generating position data used to represent positions of the designated object on the monitor on which the designated object is to be displayed; size determination data generating means for generating size determination data used to decide the size of an object; second storing means for temporarily storing the object designation data and the position data therein; inrange detecting means for making a decision as to whether or not the object should be displayed on the monitor during the next horizontal scanning period, based on position data read from the second storing means and size determination data fed from the size determination data generating means; means for reading graphic data from the first storing means with respect to an object subjected to the decision of the object being in an inrange state by the inrange detecting means; over-range determining means for making a decision as to whether or not some of the object subjected to the decision of the object being in the inrange state by the inrange detecting means lies over the range of the screen on the monitor; and read inhibiting means for inhibiting the graphic data of some of the object subjected to the decision of the object lying beyond the screen by the inrange detecting means from being read from the first storing means.

According to the third invention, the graphic data of the object subjected to the decision of it being in the inrange state both in the horizontal and vertical directions by the inrange detecting means is read from the first storing means. On the other hand, when the object is represented by the object size determined based on the object size determination data, the over-range determining means such as a size counter control circuit makes a decision as to whether or not some of the object lies beyond the left end and/or the right end in the horizontal direction on the screen of a monitor, based on the position data in the horizontal direction and considering the object size. If it is determined that some of the object lies beyond the left end, then the read inhibiting means is activated to preset an address for making a start in the reading of the graphic data of the object to a graphic data address for actually-displayed characters, thereby inhibiting the reading of ineffective graphic data. If it is detected that some of the object lies beyond the right end, then a signal is outputted. In response to the signal, the inhibiting means then inhibits the reading of the graphic data from the first storing means. Specifically, the next object designation data is latched in a register used to hold the object designation data therein, thereby proceeding to a process for the next object.

Additionally, according to the third invention, when some of the object lies beyond the screen of the monitor, the reading of the graphic data with respect to such a portion from the first storing means is prohibited. Therefore, ineffective data process with respect to some of the object which lies beyond both ends referred to above is not executed. It is therefore feasible to avoid a substantial decrease in the number of objects and simultaneously to reliably reduce any load imposed on a processor used for animation processing, thereby making it possible to render the entire processing speed faster.

The objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 1 is a schematic block diagram showing one embodiment of the present invention;

FIG. 2 is a block diagram depicting a video processor employed in the embodiment illustrated in FIG. 1;

FIGS. 6A, 6B and 6C are block diagrams each showing an animation data generating circuit shown in FIG. 2;

FIG. 12 is a diagram for describing both of a horizontal (H) position and a vertical (V) position indicative of an object on a monitor's screen;

FIGS. 14 and 15 are diagrams each illustrating one example of a memory format in a video data memory;

FIGS. 18A through 18D are diagrams each illustrative of an H-flip state and a V-flip state;

FIG. 20 is a block diagram showing an H inversion circuit and a color data extraction circuit in detail;

BEST MODE FOR CARRYING OUT THE INVENTION

Overall Construction

Figure 3:
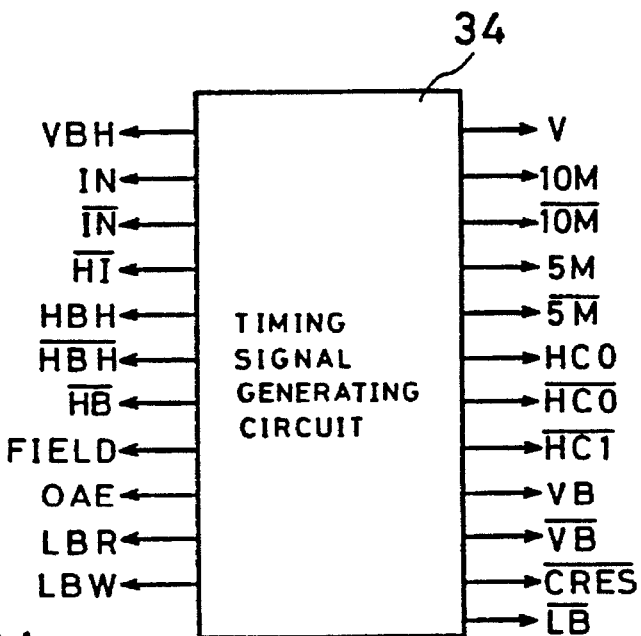
FIG. 3 is a block diagram showing a timing signal generating circuit.

Referring to FIG. 1, a microprocessor 10 serves to control a whole operation of a moving picture display apparatus such as a video processor 12, etc. in accordance with program data delivered from a program data memory 14 which is included in, for example, a loadable and unloadable memory cassette. As the microprocessor 10, a 16-bit microprocessor such as an IC "RF5A22" manufactured by RICOH CO., is used. The video processor 12 reads graphic data from a video data memory 16 in response to an instruction or command from the microprocessor 10, and then delivers the so-read data to a TV interface 18. The video data memory 16 comprises a SRAM (Static Random Access Memory) of, for example, 64K bytes, i.e., includes a background pattern storage area 16a and a character data storage area 16b. In other words, the background pattern storage area 16a and the character data storage area 16b are established by a single SRAM. The reason for this arrangement is that the operating speed is fast and the capacity of each storage area can arbitrarily be set by a character (object) and a background pattern. In addition, a sound circuit 20 generates data indicative of necessary music and an effective sound in digital form in accordance with the instruction given by the microprocessor 10 so as to be supplied to the TV interface 18. The TV interface 18 converts graphic data produced from the video processor 12 into a RGB signal and then supplies the same to a video circuit of a RGB monitor 22. In addition, the TV interface 18 converts sound data generated from the sound circuit 20 into a sound signal so as to be supplied to a sound circuit in the RGB monitor 22. Incidentally, for example, an integrated circuit "CXD1222Q" made by SONY CORP. is available as the sound circuit 20. Thus, an object such as a video game and a background pattern, which change according to the progress of programs preset in the program data memory 14, are displayed on the screen of the RGB monitor 22.

Incidentally, the embodiment illustrated in FIG. 1 shows a case where the TV interface 18 converts the graphic data into the RGB signal. However, the present embodiment may alternatively use a TV interface which converts graphic data into a television video signal. In this case, a domestic TV receiver which is commonly available may be used as a monitor.

FIG. 2 is a block diagram showing, in detail, the video processor 12 in the embodiment illustrated in FIG. 1. The video processor 12 includes a CPU interface 24 having a data latch for latching data from the microprocessor 10 therein and an address decoder or the like. The CPU interface 24 includes a CPU interface 24a for background image processing and a CPU interface 24b for animation (object) processing. The CPU interface 24a is activated in such a way as to make it possible to carry out the transfer of data relative to the background image between the microprocessor 10 and the video processor 12. On the other hand, the CPU interface 24b is activated so as to enable the transfer of data relative to the object between the microprocessor 10 and the video processor 12.

Then, a background image data generating circuit 26 reads pattern data (character code) representative of a background image from the background pattern storage area 16a of the video data memory 16 in response to program data outputted from the microprocessor 10 via the CPU interface 24a. Thereafter, the background image data generating circuit 26 reads graphic data indicative of a background image from the character data storage area 16b of the video data memory 16 based on the pattern data thus read and then supplies the so-read graphic data to a composition circuit 28. On the other hand, a moving picture data generating circuit 30 in which the present invention is concerned will be described later in more detail. However, the animation data generating circuit 30 reads graphic data indicative of an object from the character data storage area 16b of the video data memory 16 on the basis of program data generated from the microprocessor 10 and delivers the thus read data to the composition circuit 28.

As will be described later, the composition circuit 28 determines or enforces the priority level as to whether either the object or the background pattern should be indicated when the object and the background pattern are superposed on each other. Therefore, if the object is given the highest priority, then it is displayed on the screen. However, the background pattern, which is superimposed on the object, is not displayed thereon. If the background pattern is given the highest priority, then it is displayed on the screen, but the object which is superimposed on the background is not displayed thereon. Thus, the graphic data synthesized by the composition circuit 28 is supplied to an image signal generating circuit 32. The image signal generating circuit 32 has a color encoder for creating a RGB signal in accordance with a color code per dot (pixel) outputted from the composition circuit 28. The RGB signal to be created by the color encoder is delivered to the monitor 22 as described above.

Figure 4A:
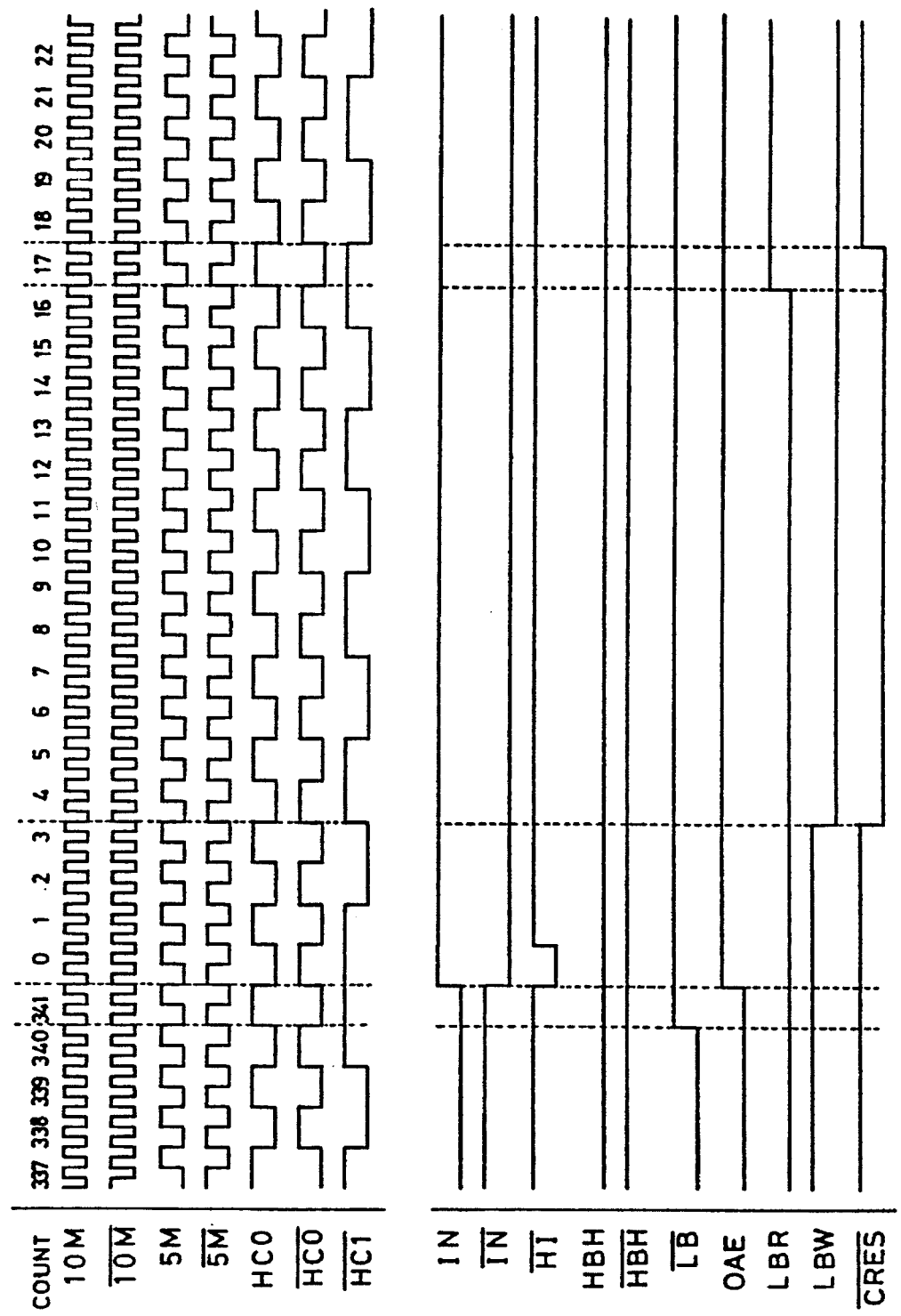
FIGS. 4A an 4B are timing charts for describing respective timing signals in a horizontal direction.
Figure 4B:
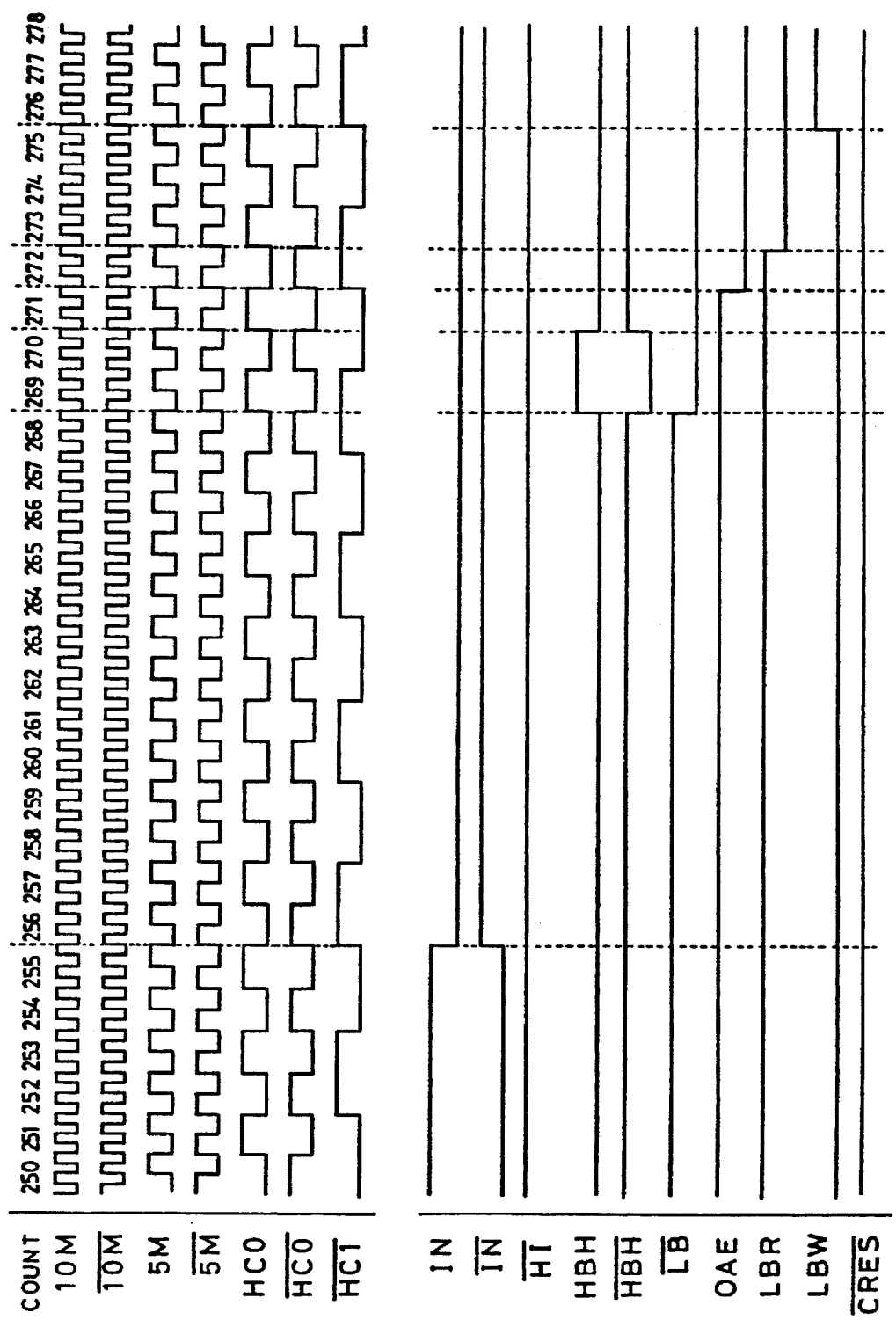

Then, a timing signal generating circuit 34 receives a fundamental clock of 21.47727 MHz illustrated in FIGS. 4A and 4B so as to be electrically processed by using, for example, a counter, a decoder, a logic circuit, etc. thereby to generate a number of timing signals shown in FIG. 3 and FIGS. 4A and 4B. Thereafter, the timing signal generating circuit 34 serves to apply these timing signals to the CPU interface 24, the background image data generating circuit 26, the composition circuit 28, the animation data generating circuit 30, the image signal generating circuit 32, etc.

Described more specifically, when the fundamental clock is frequency-divided by ½, either a timing signal 10M or /10M ( "/" is simply the inverse of 10M in the present specification) is obtained. When such a timing signal is further frequency-divided by ½, either a timing signal 5M or /5M is obtained.

Figure 5:
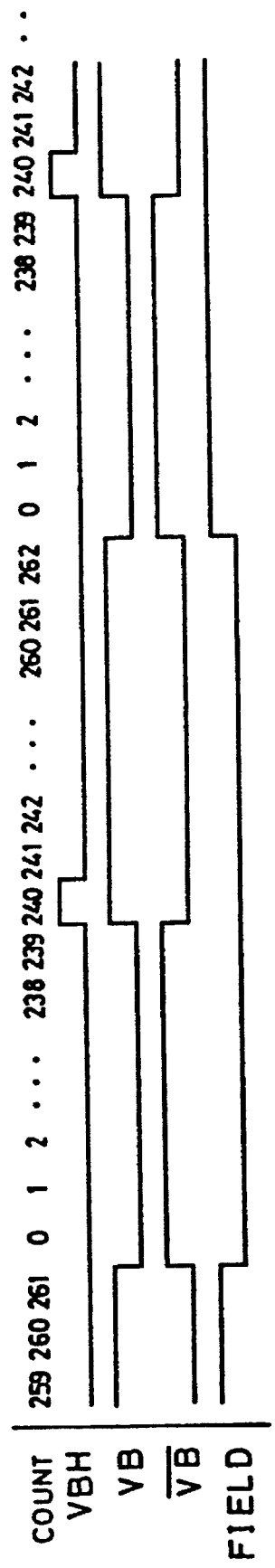
FIG. 5 is a timing chart for describing respective timing signals in a vertical direction.

The period required to display 1 dot (pixel) on the screen of the RGB monitor 22 (see FIG. 1) corresponds to one complete cycle of the timing signal 5M. Thus, the time of "0–341" as a count value of the timing signal 5M is of a horizontal period. The time of "0–268" as a count value of the timing signal 5M during such a horizontal period corresponds to one horizontal line representation or display period, whereas the time of "269–341" as a count value thereof is equivalent to a horizontal blanking period. A vertical signal V (see FIG. 3) is produced for each horizontal period, i.e., each time the count value of the timing signal 5M is of "0–341", and thereafter counted into a vertical position under scanning, i.e., a line number. If one field at the time of interlaced scanning is of 262 horizontal lines as shown in FIG. 5, then a timing signal FIELD is obtained during an interval in which a count value of the vertical signal V is of "0–262". The period in which the signal FIELD is of a high level corresponds to one vertical period, and "0–239" as a count value of the signal V is equivalent to a vertical representation period. In addition, "240–262" as a count value of the signal V corresponds to a vertical blanking period.

As shown in FIG. 5, a timing signal VBH is outputted during an interval in which a count value of the vertical signal is of "240", and shows the beginning of the vertical blanking period. The timing signal VB is rendered high in level during the vertical blanking period, and the timing signal /VB is rendered high in level during the vertical representation period.

A timing signal HCO shown in FIGS. 4A and 4B is obtained by frequency-dividing the above signal 5M by ½, whereas a timing signal /HCO is obtained by simply inverting the signal HCO. A timing signal /HC1 is obtained by frequency-dividing the signal /HCO by ½. As shown in FIGS. 4A and 4B, a timing signal IN is of a signal which is rendered high in level, i.e., indicative of a state of an object being under the operation of inrange detection during the horizontal representation period, i.e., during an interval in which the count value of the signal 5M is of "0–255". In addition, a timing signal /IN is simply the inverse of the timing signal IN. A timing signal /HI is outputted for each horizontal period during an interval in which the count value of one signal 5M is of "0". As shown in FIG. 4B, a timing signal HBH is outputted during the count value of the signal 5M is of "269–270", and shows the beginning of the horizontal blanking period. In addition, a timing signal /HBH is simply the inverse of the signal HBH. Thus, the timing signal /HBH is rendered high in level during an interval in which the count value of the signal 5M is of "271–268". Incidentally, a timing signal /HB is rendered low in level during the horizontal blanking period. As shown in FIGS. 4A and 4B, a timing signal /LB is outputted as a high level during an interval in which the count value of the signal 5M is of "341–268", whereas a timing signal OAE is outputted as a high level during an interval in which the count value of the signal 5M is of "0–271", as shown in FIGS. 4A and 4B. As illustrated in FIGS. 4A and 4B, a timing signal LBR is outputted as a high level during an interval in which the count value of the signal 5M is of "17–272", whereas a timing signal LBW is outputted as a high level during an interval in which the count value of the signal 5M is of "276–3". Furthermore, a timing signal /CRES is produced as a low level during an interval in which the count value of the signal 5M is of "3–17" as depicted in FIGS. 4A and 4B.

Figure 6A:
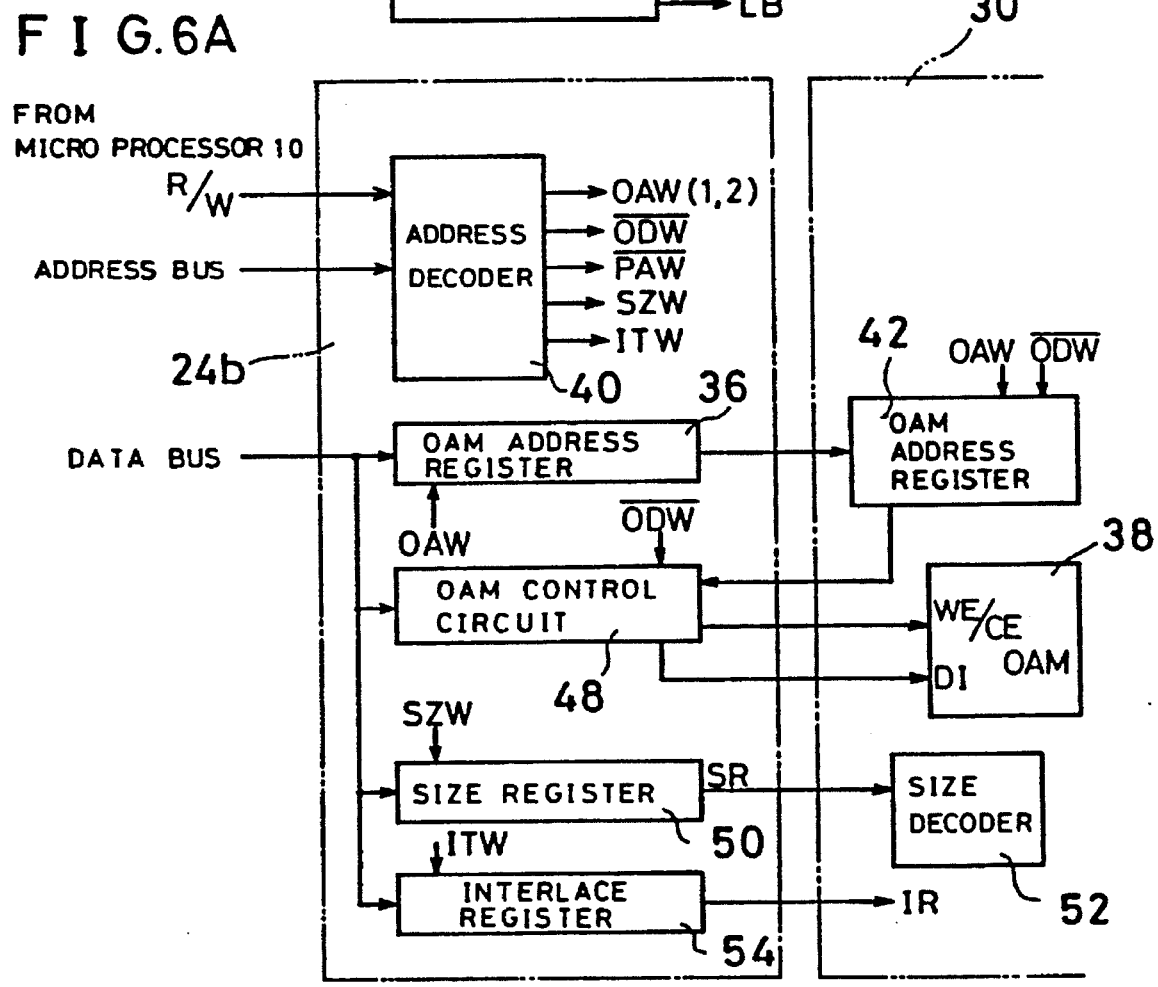
Figure 7:
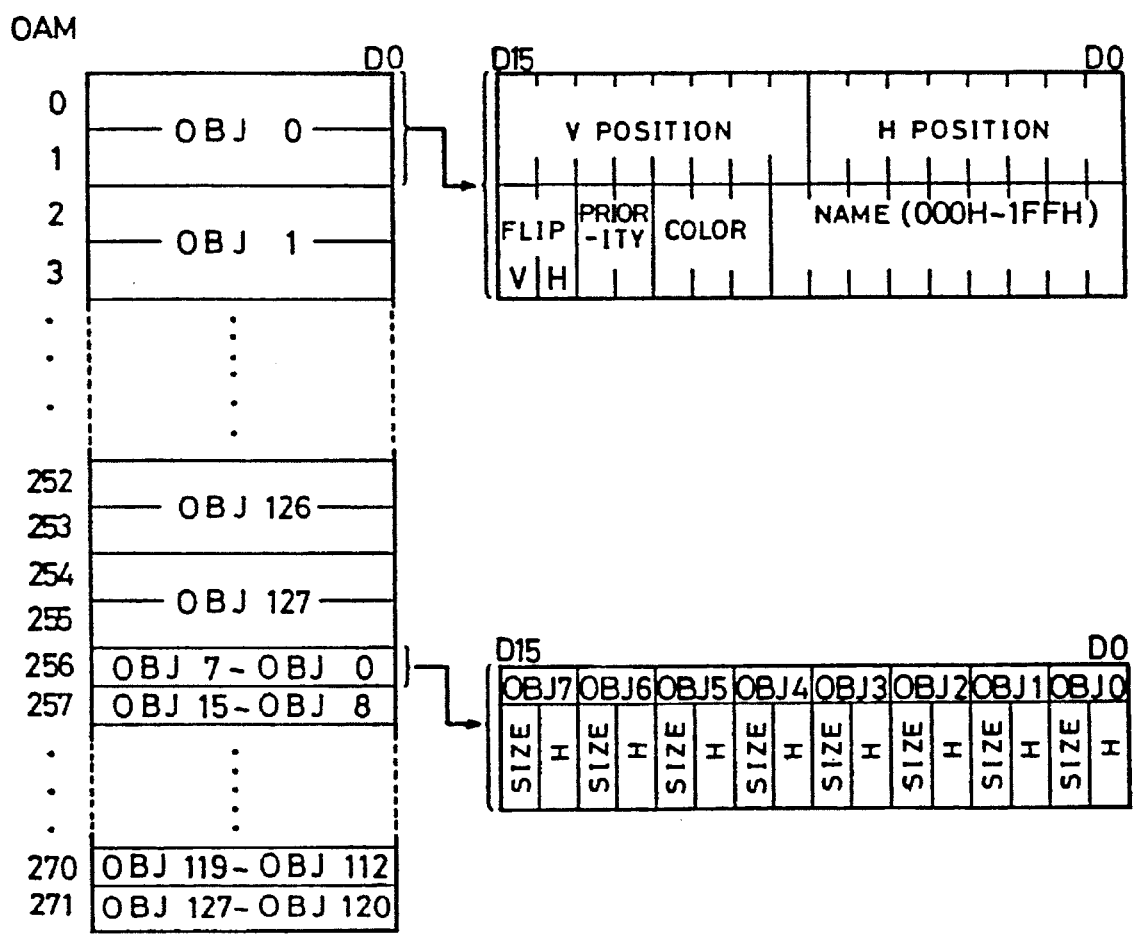
FIG. 7 is a diagram for describing one example of object data.

As shown in FIG. 6A, the CPU interface 24b includes a 8-bit OAM address register 36 used to receive data from a data bus of the microprocessor 10. The OAM address register 36 receives an address from the microprocessor 10 when data is written into an OAM (Object Attribute Memory) included in the animation data generating circuit 30 so as to establish an initial address for the OAM 38. The OAM 38 has the storage capacity of 34 bits×128, i.e., 128 by 34 bits, for example, and is capable of storing therein respective object data of 128 objects. As shown in FIG. 7, these object data are respectively formed of 34 bits in total. As the object data, there are included 9-bit object designation data (name data), 8-bit vertical position data, 9-bit horizontal position data and 1-bit object size selection data as well as 3-bit color pallet data, 1-bit horizontal and vertical flip data and 2-bit priority representation data or the like.

As is well known, the object data shown in FIG. 7 have been preset in the program data memory 14 included in the above-described memory cassette, i.e., an external memory according to the contents of games, for example. In addition, object data read from the program data memory 14 are supplied to the OAM 38 by the microprocessor 10.

An address decoder 40 receives a read/write signal R/W from the microprocessor 10 and an address from an address bus so as to generate respective signals OAW, /ODW, PAW, SZW and ITW therefrom. The signal OAW is delivered to the OAM address register 36 as a write signal thereof. The OAM address register 36 is loaded with an initial address outputted from the microprocessor 10 in response to the signal OAW.

An OAM address circuit 42 included in the animation data generating circuit 30 principally includes an address counter and is enabled by the signal OAW. The OAM address circuit 42 receives an initial address from the OAM address register 36 so as to increment the same in unison with the timing of the signal /ODW, thereby supplying address data for sequentially designating addresses in the OAM 38 to an address selection circuit 44 (see FIG. 6B). The address selection circuit 44 is also supplied with address data from a vector RAM 46. The vector RAM 46 stores therein an address of an object to which a decision to the effect that it is in an inrange state has been made by an inrange detection circuit 56 to be described later. The address selection circuit 44 selects either address data produced from the OAM address circuit 42 or address data produced from the vector RAM 46 so as to supply the result of its selection to the OAM 38.

The signal /ODW from the address decoder 40 is supplied to an OAM control circuit 48 as an enable signal thereof. The OAM control circuit 48 outputs a write signal WE and data so as to be supplied to the OAM 38 when the OAM control circuit 48 writes the data from the microprocessor 10 into the OAM 38.

A size register 50 is of a 3-bit register and loaded with any one of size data "000–101" given in Table I shown below, which are represented in the form of 3-bits indicative of data D5 to D7 fed from the microprocessor 10. Specifically, when an address, data and a write signal for specifying the size register 50 are fed from the microprocessor 10, the address decoder 40 outputs the signal SZW. The size register 50 is loaded with size data in response to the signal SZW. The size data from the size register 50 is supplied to the size decoder 52 in the animation data generating circuit 30. The size decoder 52 serves to decode the thus-supplied size data so as to produce each of signals S8, S16, S32 and S64 indicative of object sizes which are different from one another.

TABLE I

| Size data | | | Size selection data | |
|---|---|---|---|---|
| D7 | D6 | D5 | 0 | 1 |
| 0 | 0 | 0 | 8 × 8 | 16 × 16 |
| 0 | 0 | 1 | 8 × 8 | 32 × 32 |
| 0 | 1 | 0 | 8 × 8 | 64 × 64 |
| 0 | 1 | 1 | 16 × 16 | 32 × 32 |
| 1 | 0 | 0 | 16 × 16 | 64 × 64 |
| 1 | 0 | 1 | 32 × 32 | 64 × 64 |

In addition, a 2-bit interlace register 54 receives 1-bit interlace data indicative of either interlace or non-interlace and data OBJ V SEL which determines whether 1 dot is represented by 1 line or represented by 2 lines at the time of interlace, from the microprocessor 10. More specifically, when an address, data and a write signal for specifying the interlace register 54 are supplied from the microprocessor 10, the address decoder 40 outputs a signal ITW. Then, the interlace register 54 is responsive to the signal ITW so as to be loaded with the interlace data and the data OBJ V SEL.

In the illustrated embodiment, 32 objects can be represented or displayed by 1 line at the maximum. It is therefore necessary to specify which object out of 128 objects capable of being displayed on one screen should be represented by the next line. To this end, the inrange detection circuit 56 and the vector RAM 46 shown in FIG. 6B are utilized. Thus, the vector RAM 46 has the storage capacity of 7 bits×32, i.e., 32 by 7 bits indicative of object numbers.

A vector RAM address circuit 58 mainly includes a counter and increments an address for the vector RAM 46 each time a signal /INRANGE is supplied from the inrange detection circuit 56. Incidentally, when objects subjected to an inrange state are not present in a horizontal line, the vector RAM address circuit 58 supplies a signal /NONOBJ indicative of its absence to a buffer RAM control circuit 92 (see FIG. 6C) to be described later. As described above, 1 line can display only 32 objects at the maximum. Therefore, when the number of objects subjected to the inrange state reaches 32, the vector RAM address circuit 58 outputs a signal INRANGE FULL so as to be supplied to the inrange detection circuit 56. Correspondingly, the inrange detection circuit 56 stops the supply of a subsequent inrange detection output to the vector RAM address circuit 58.

A size counter 60 shown in FIG. 6B outputs data SC used to determine which character of a plurality of characters constituting an object should be displayed as seen from the left side when it is desired to represent the object. The size counter 60 receives initial-value data from a size counter control circuit 62 so as to increment the initial value in response to a signal /HCO generated from the timing signal generating circuit 34. The result of its increment is outputted from the size counter 60 as the above-described data SC, which is used to calculate an address at a horizontal (hereinafter be abbreviated "H") position arithmetic circuit 64 to be described later.

The size counter control circuit 62 outputs a signal L indicative of the timing for loading horizontal position data of a new object into the H position arithmetic circuit 64. More specifically, this signal L is of a timing signal for executing an electrical process for the next object, and supplied to the vector RAM address circuit 58. The vector RAM address circuit 58 is responsive to the signal L so as to decrement a vector RAM address. Thus, each address of the vector RAM 46 is changed for each signal L. Unless the signal L is outputted from the size counter control circuit 62, the operation for bringing each address in the vector RAM address circuit 58 up to data is stopped. Specifically, when a large object is used, an address in the OAM 38 to be used should be the same while characters of such an object are electrically being processed. Therefore, such an address in the OAM 38 will remain unchanged until all the characters of one object are electrically processed in accordance with the signal L. Incidentally, the signal L can be obtained by delaying a signal C with a D-FF corresponding to a first stage.

As described above, the horizontal (H) position data, the vertical (V) position data, the attribute data and the name data are temporarily stored in the OAM 38. However, these data read by the OAM 38 are respectively loaded into a 9-bit type H-position register 66, a 8-bit type V-position register 68, a 8-bit type attribute register 70 and a 9-bit type name register 72, respectively, under the control of the register control circuit 74. The register control circuit 74 controls load timing of each of the registers 66, 68, 70 and 72 in response to the signals L and C from the size counter control circuit 62.

The H-position register 66 supplies H-position data HP to the H position arithmetic circuit 64. In addition, the data HP is also supplied to the size counter control circuit 62. The H position arithmetic circuit 64 performs an arithmetic operation on absolute value data HA indicative of a horizontal (H) position of an object and delivers the data thus operated to the inrange detection circuit 56 and a buffer RAM address circuit 90 to be described later, after which the data is used as an address of a buffer RAM 84. The H position arithmetic circuit 64 adds the data indicative of the H position and the data SC from the size counter 60 and supplies the result of its addition to the size counter control circuit 62.

A V position arithmetic circuit 76 receives vertical (V) position data VP and a vertical interval signal V and subtract the V position of the object from the position of a horizontal line which is under scanning at present. The result of its subtraction is used as data for determining whether or not the object should be represented by the next horizontal line. The result of its subtraction is applied to the inrange detection circuit 56 and the address adder control circuit 78.

The inrange detection circuit 56 to be described in detail later determines whether or not the object should be represented or displayed by the next horizontal line, i.e., the object is in an inrange state, based on the H and V positions data given in this way, and size data SR, interlace data IR and attribute data AR. The inrange detection circuit 56 executes determination as to whether or not the object is in the inrange state 128 times during one horizontal scanning period. When the number of objects subjected to the inrange state reaches 32 as described above, the vector RAM address circuit 58 supplies a signal INRANGE FULL to the inrange detection circuit 56. Thus, the inrange detection circuit 56 does not supply a signal /INRANGE to the vector RAM address circuit 58 after the signal INRANGE FULL is supplied thereto.

The address adder control circuit 78 processes incoming data before an address adder 80 performs an addition process. Specifically, the address adder control circuit 78 receives the H position data and the V position data outputted from the H position arithmetic circuit 64 and the V position arithmetic circuit 76 respectively as well as reception of the data SR from the size register 50, the data IR from the interlace register 54 and the data AR from the attribute register 70. When the H position data is represented by an H-flip (the inverse of H) or the V position data is represented by a V-flip (the inverse of V), the address adder control circuit 78 changes a value to be added to another. Then, the address adder 80 adds together data outputted from the address adder control circuit 78 and object code data (which corresponds to a character name, i.e., a reference address placed at an upper position as viewed from the left-hand side of the character data storage area 16a of the video data memory 16 shown in FIG. 1) so as to create an address for the character data storage area 16a. Thus, such an address is outputted to a video data memory/address circuit 82.

Figure 6C:
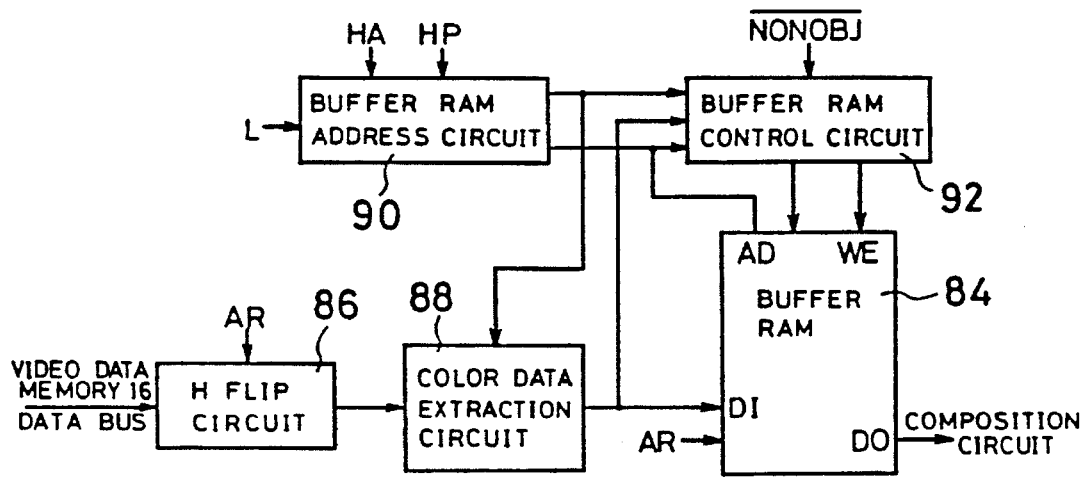
Figure 21:
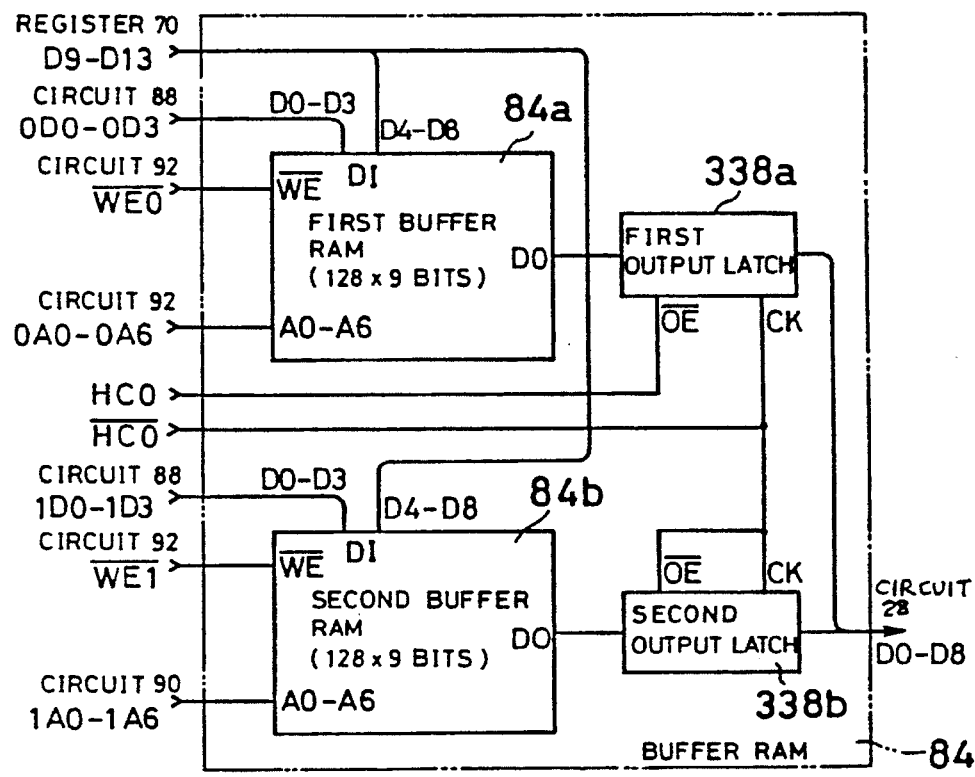
FIG. 21 is a block diagram depicting a buffer RAM in detail.

The buffer RAM 84 shown in FIG. 6C has the storage capacity of 256 by 9 bits, and temporarily stores color pallet data, priority level data, etc. therein. An H flip circuit 86, which is electrically connected to a data bus used for the video data memory 16, receives color data of respective dots (pixels) read from the character data storage area 16b so as to invert the horizontal (H) direction for each dot unit based on an inverse instruction given by the data AR produced from the attribute register 70. Thereafter, the H flip circuit 86 supplies the color data to a color data extraction circuit 88. The color data extraction circuit 88 collects the color data inputted for every four color cells to produce 4-bit color data per dot, which is supplied to a data input DI of the buffer RAM 84. On the other hand, since the color pallet data (3 bits) and the priority level data (2 bits) from the attribute register 70 are also supplied to the buffer RAM 84, the buffer RAM 84 stores therein 9-bit data per dot as described above.

A buffer RAM address circuit 90 receives the absolute value data HA of the H address from the H position arithmetic circuit 64 and the H position data HP from the H-position register 66. Then, the buffer RAM address circuit 90 increments an address outputted from the buffer RAM 84 up to "0–255" during a display period and supplies the thus incremented address to the buffer RAM 84. Thus, the buffer RAM 84 reads out color data or the like in dot sequence. When the writing of data into the buffer RAM 84 is carried out, the buffer RAM address circuit 90 creates a write address for the buffer RAM 84 based on the absolute value data HA. However, the reading or writing of the data from and into the buffer RAM 84 is controlled by the buffer RAM control circuit 92. More specifically, the buffer RAM control circuit 92 receives the signal /NONOBJ generated from the vector RAM address circuit 58 (see FIG. 6B) so as to prohibit the data from being written into the buffer RAM 84. When the color data indicates "transparence", the buffer RAM control circuit 92 likewise prohibits the data from being written into the buffer RAM 84.

A detailed description will now be made of the above-described respective circuits with reference to FIGS. 8 through 21.

DETAILED CIRCUITS

OAM Address Circuit 42

Figure 8:
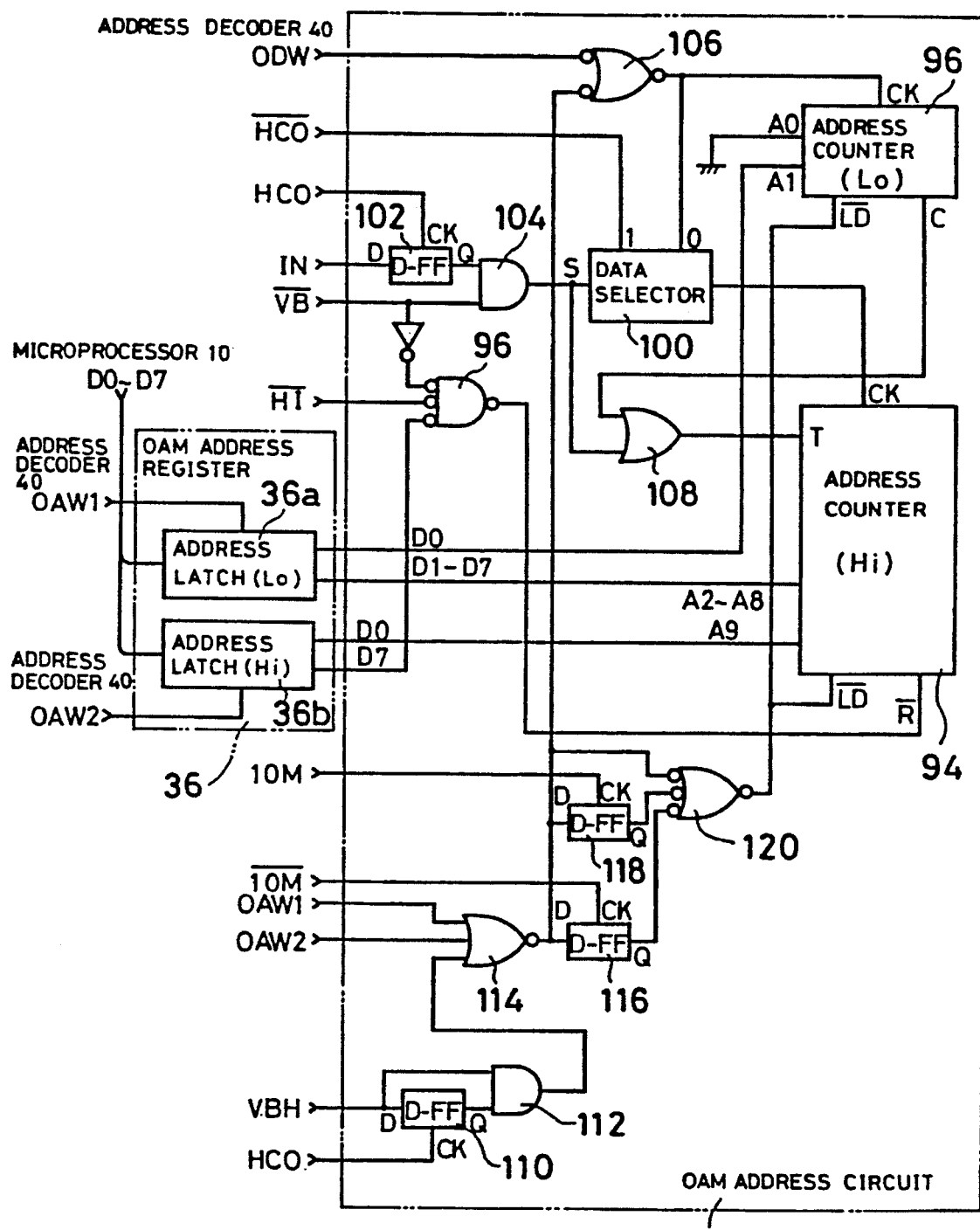
FIG. 8 is a block diagram showing an OAM address circuit in detail.

The OAM address circuit 42 shown in FIG. 8 includes a 8-bit address counter (Hi) 94 and a 2-bit address counter (Lo) 96. The address counter 94 is supplied with address inputs A2 to A8 from an address latch (Lo) 36a of the OAM address register 36 and with an address input A9 from an address latch (Hi) 36b thereof. The address counter 96 is supplied with an address input A1 from the address latch 36a. The address A1 is used to specify either one of 2 words of an object, whereas the addresses A2 to A8 are used to specify any one of 128 objects. A NAND gate 98 is supplied with a data Output D7 produced from the address latch 36b together with the signals /HI and /VB (i.e., the inversion of VB) generated from the timing signal generating circuit 34. Thus, the data output D7 is supplied via the NAND gate 96 to a reset input R of the address counter 94. When the data D7 is rendered low in level, the address counter 94 is reset, and starts counting from 0 at all times so as to be incremented. As a consequence, when it is desired to make a decision as to whether or not an object is in an inrange state, the object, which has firstly been read and then determined to be in the inrange state, is processed as being given the highest priority. When the data D7 is of "1", the address counter 94 is not reset, the data which has finally been inputted from the microprocessor 10 (see FIG. 1) is established as an initial value data as it is. Thus, an object designated by such an initial value data is given the highest priority.

A data selector 100, which receives the signal /HCO generated from the timing signal generating circuit 34, selectively supplies to the address counter 94 clocks whose frequencies are different from one another during the vertical blanking period and a period other than the vertical blanking period. More specifically, since the output of a D-FF 102 supplied with the signal IN generated from the timing signal generating circuit 34 as a data input and the signal HCO generated from the timing signal generating circuit 34 as a clock, is supplied to the input of an AND gate 104, and the signal /VB generated from the timing signal generating circuit 34 is inputted to the AND gate 104, the AND gate 104 generates a signal which is rendered low in level during the vertical blanking period. The data selector 100 is responsive to the signal of the low level so as to make a decision as to whether a clock synchronized with the signal /HCO generated from the timing signal generating circuit 34 is supplied to the clock of the address counter 94 or a clock synchronized with the access timing from the microprocessor 10, i.e., the signal OAW from the address decoder 40 (see FIG. 6A). Thus, the address counter 94 is supplied with a clock which is in synchronism with the timing at which the microprocessor 10 obtains access to the address counter 94 during the vertical blanking period, whereas the address counter 94 is supplied with a clock synchronized with internal timing during a period other than the vertical blanking period.

The output of the AND gate 104 is supplied via an OR gate 108 to the address counter 94 as an enable input T thereof together with a carry signal C outputted from the address counter 96.

The signal VBH generated from the timing signal generating circuit 34 is supplied to a D-FF 110 as a data input thereof, whereas the signal HCO from the timing signal generating circuit 34 is delivered to the D-FF 110 as a clock input thereof. The signal VBH is also fed to the output of the D-FF 110 and an AND gate 112. Thus, the output of the AND gate 112 is rendered high in level at the timing of the signal HCO. In addition, the output of the AND gate 112 is supplied via a NOR gate 114 to a data input of each of D-FFs 116 and 118 together with signals OAW1 and OAW2 produced by the address decoder 40. The signal /10M generated from the timing signal generating circuit 34 is supplied to the D-FF 116 as a clock thereof, whereas the signal 10M generated from the timing signal generating circuit 34 is applied to the D-FF 118 as a clock thereof. The outputs of the D-FFs 116 and 118 are supplied to the input of a NOR gate 120 together with the output of the NOR gate 114. Thus, the NOR gate 120 outputs numerical data equivalent to an address to a data bus when the microprocessor 10 establishes each address of the OAM 38. However, a timing signal LD for loading the numerical data into the address counter 94 is supplied to the address counter 94.

Address Selection Circuit 44, OAM Control Circuit 48 and OAM 38

Figure 9:
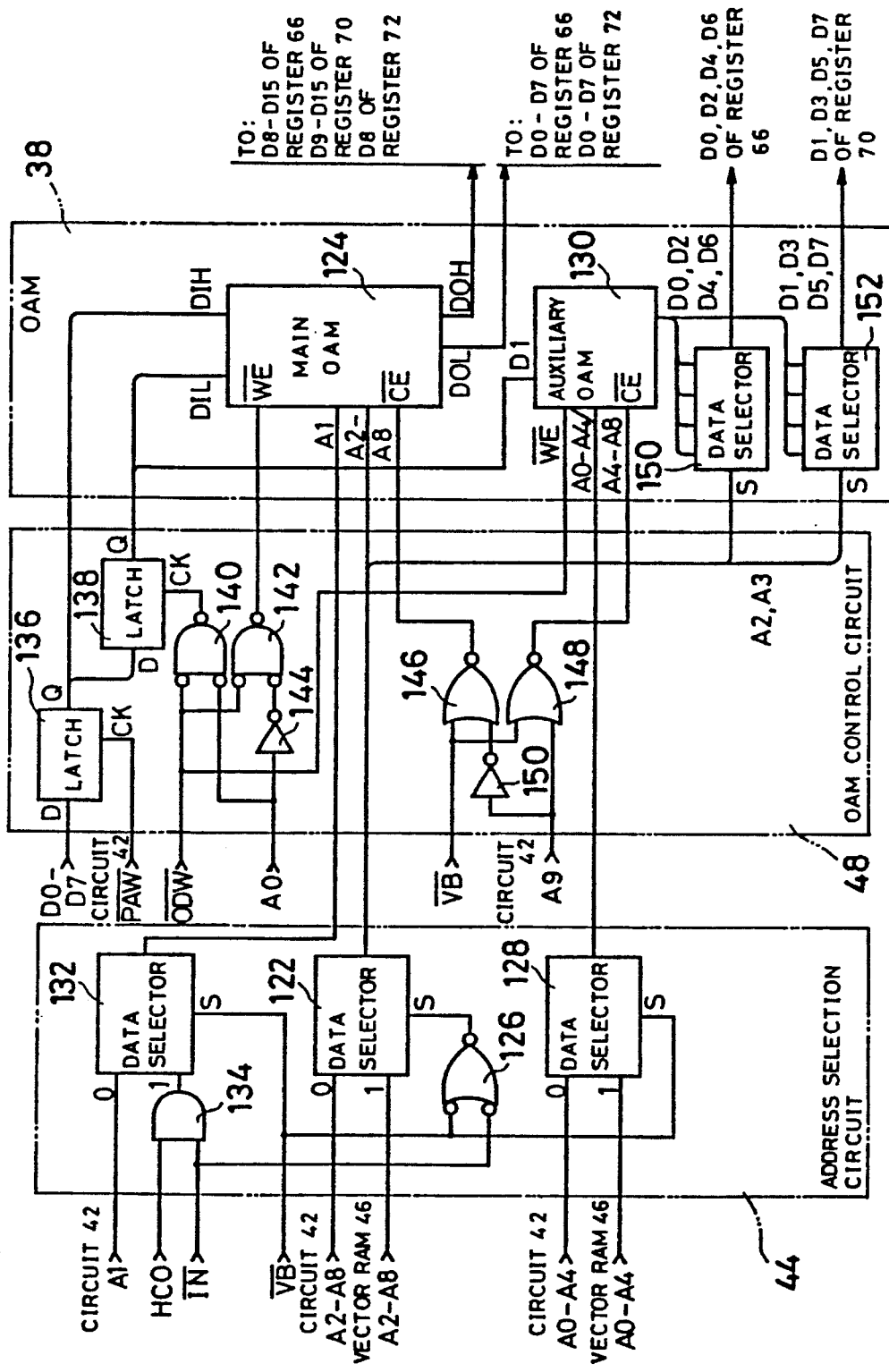
FIG. 9 is a block diagram illustrating an address selection circuit, an OAM control circuit and an OAM in detail.

The address selection circuit 44 shown in FIG. 9 serves to select either addresses A2 to A8 outputted from the address counter (Hi) 94 of the OAM address circuit 42 or addresses A2 to A8 fed from the vector RAM 46 so as to supply the same to a main OAM 124 of the OAM 38. More specifically, the signals /VB and /IN generated from the timing signal generating circuit 34 are supplied via a NOR gate 126 to a data selector 122. Thus, the data selector 122 supplies the addresses A2 to A8 fed from the OAM address circuit 42 to the main OAM 124 during the vertical blanking period. Similarly, a data selector 128 serves to select either addresses A0 to A4 fed from the address counter (Hi) 94 and the address counter (Lo) 96 in the OAM address circuit 42 or addresses A0 to A4 from the vector RAM 46 in response to the signal /VB generated from the timing signal generating circuit 34 so as to supply the same to an auxiliary OAM 130 of the OAM 38. In addition, a data selector 132 selects either an address A1 from the address counter 96 of the OAM address circuit 42 or the output of an AND gate 134 in response to the signal /VB generated from the timing signal generating circuit 34. The two inputs of the AND gate 134 are supplied with the signal HCO and the signal /IN generated from the timing signal generating circuit 34. Thus, data outputted from the microprocessor 10 are written into the OAM 38 during the vertical blanking period, whereas higher or leftmost object data DOH and lower or rightmost object data DOL are read from the main OAM 124, i.e., the OAM 38 in response to an internal clock during a period other than the vertical blanking period so as to be outputted therefrom.

The OAM 38 is divided into two sections, i.e., the main OAM 124 and the auxiliary OAM 130. The reason for this is that the data bus for the microprocessor 10 is of 8 bits and the object data stored in the OAM 38 are of 34 bits as described above. Specifically, as shown in FIG. 7, 8-bit data is stored in the main OAM 124 four times, and the remaining 2 bits (=34 to 32) are lumped or multiplied by four so as to be 8-bit data, which is in turn stored in the auxiliary OAM 130. Thus, the most significant bit of 9-bit H position data and 1-bit size selection data are stored in the auxiliary OAM 130.

The OAM control circuit 48 includes 8-bit data latches 136 and 138, which are used for writing of the object data produced by the microprocessor 10 into the OAM 38. Specifically, data D0 to D7 are supplied to the data latch 136 as an input thereof, whereas the output of the data latch 136 is delivered to the data latch 138 as an input thereof. The data latches 136 and 138 are supplied as latch signal thereof with the signal /PAW outputted from the address decoder 40 (see FIG. 6A) and the output of a NAND gate 140, respectively. The NAND gate 140 receives the address A0 outputted from the OAM address circuit 42 and the signal /ODW outputted from the address decoder 40. The address A0 is inverted by an inverter 144 so as to be supplied to a NAND gate 142 as an input thereof. In addition, the NAND gate 142 accepts the signal /ODW referred to above. Thus, when the address A0 is low in level, the data latch 138 latches data in response to the signal /ODW. When the address A0 is high in level, the NAND gate 142 supplies a write signal to the main OAM 124, and higher and lower object data DIH and DIL which have been latched in the data latches 136 and 138 respectively are written into the main OAM 124.

Since the auxiliary OAM 130 is not of a 16-bit type, the writing of data into the OAM 130 is completed by activating the OAM 130 once. Thus, the signal /ODW is supplied to the auxiliary OAM 130 as a write signal thereof, and the object data which has been latched in the data latch 138 is written into the auxiliary OAM 130.

Additionally, the OAM control circuit 48 includes two NOR gates 146 and 148. The NOR gate 146 is supplied with an address A9 of the OAM address circuit 42 which is inverted by an inverter 150, and the signal /VB generated from the timing signal generating circuit 34. In addition, the NOR gate 148 is directly supplied with the address A9 and the signal /VB. Thus, when the address A9 is high in level during the vertical blanking period, the NOR gate 148 supplies an enable signal to the auxiliary OAM 130. When it is of a low level, the NOR gate 146 delivers an enable signal to the main OAM 124. The higher object data DOH read from the main OAM 124 is loaded into the V-position register 68, the attribute register 70 and the name register 72, whereas the lower object data DOL read therefrom is loaded into the H-position register 66 and the name register 72. As described above, specific data of object data are stored in the auxiliary OAM 130 in such a way that four objects are lumped or collected. Therefore, data selectors 150 and 152 load 2 bits which belong to 32-bit object data in the main OAM 124 into the H-position register 66 and the attribute register 70 in the same timing as the load timing of the data in the main OAM 124.

Vector RAM Address Circuit 58 and Vector RAM 46

Figure 10:
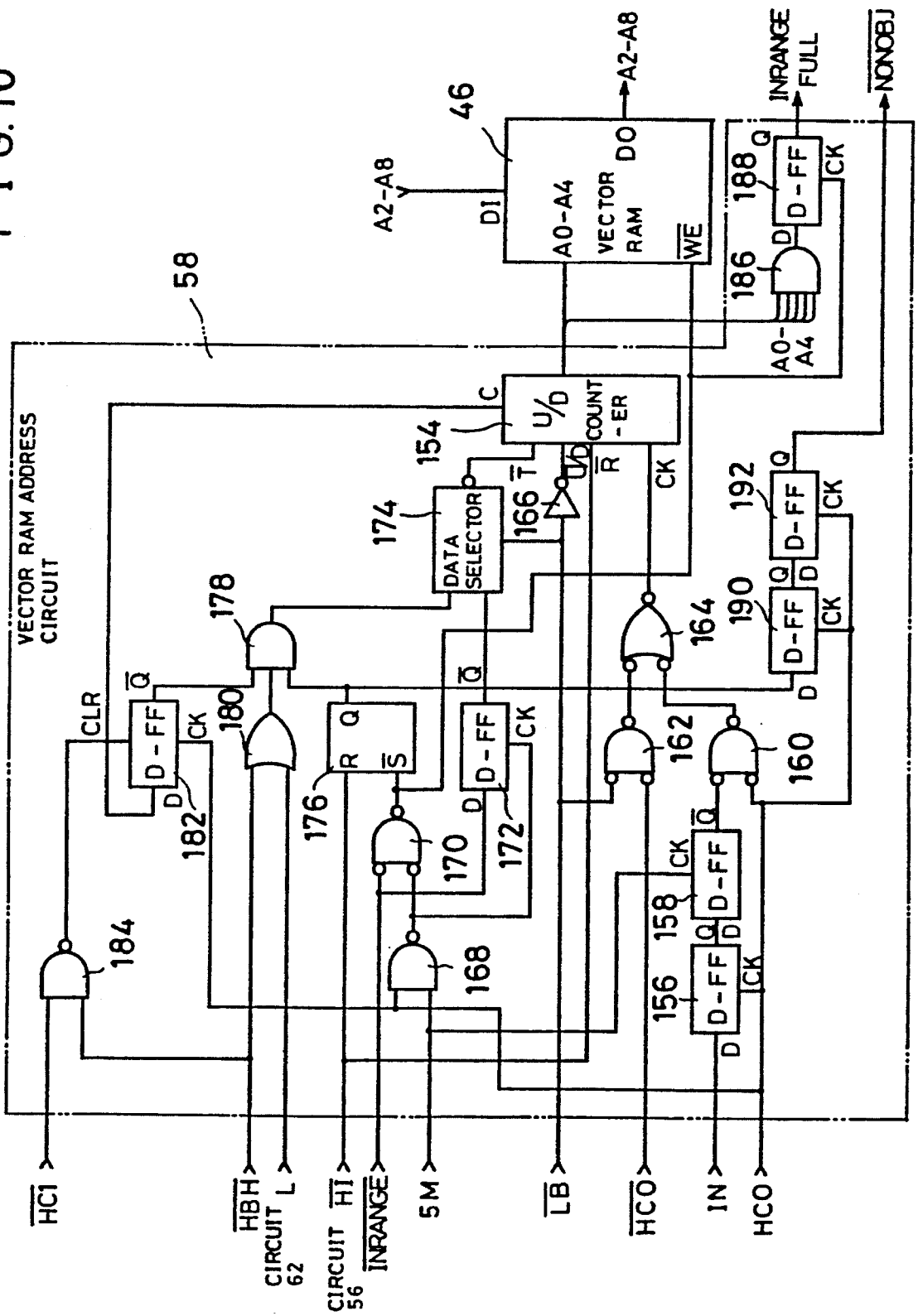
FIG. 10 is a block diagram depicting a vector RAM address circuit and a vector RAM in detail.

The vector RAM address circuit 58 shown in FIG. 10 includes a 5-bit reversible counter, i.e., a U/D counter 154. Data counted by the U/D counter 154 are supplied to addresses A0 to A4 of the vector RAM 46. The signal IN generated from the timing signal generating circuit 34 is supplied to a data input of a D-FF 156 whose output is delivered to a data input of a D-FF 158. The signals HCO and 5M generated from the timing signal generating circuit 34 are supplied to the D-FFs 156 and 158 as clock inputs thereof respectively. The output of the D-FF 158 is fed to a NAND gate 160 as an input thereof together with the signal HCO, and the output of the NAND gate 160 and the output of a NAND gate 162 are delivered to a NOR gate 164 as two inputs thereof. Incidentally, the signals /LB and /HCO generated from the timing signal generating circuit 34 are supplied to two inputs of the NAND gate 162. In addition, the output of the NOR gate 164 is sent to the U/D counter 154 as a count input thereof, i.e., a clock thereof. Thus, the clock of the U/D counter 154 is determined by the signal HCO generated from the timing signal generating circuit 34.

The signal /LB generated from the timing signal generating circuit 34 is supplied via an inverter 166 to the U/D counter 154 as an input U/D for selecting either a count-up operation of the U/D counter 154 or a count-down operation thereof. Thus, when the signal /LB is of a high level, the U/D counter 154 is used as an up counter, whereas it is used as a down counter when it is of a low level.

Further, the signals 5M and HCO generated from the timing signal generating circuit 34 are supplied to the input of a NAND gate 168 whose output is delivered to a NAND gate 170 together with the signal /INRANGE generated from the inrange detection circuit 56. Then, the signal /INRANGE is supplied to a data input of a D-FF 172, and the output of the NAND gate 168 is supplied to the D-FF 172 as a clock thereof. The output of the D-FF 172 is delivered to a data selector 174 as one input thereof, and the signal /LB is fed to the data selector 174 as a changeover input thereof. In addition, the output of the NAND gate 170 is supplied to a RS-FF 176 as a set input /S thereof, and the signal /HI generated from the timing signal generating circuit 34 is applied to the RS-FF 176 as a reset input /R thereof. The output of the RS-FF 176 is sent to an AND gate 178 as an input thereof. Either the signal /HBH or L generated from the timing signal generating circuit 34 and the output of a D-FF 182 are supplied via an OR gate 180 to the AND gate 178 as other inputs thereof.

Therefore, when the signal /LB is rendered high in level during a period in which inrange detection is to be carried out, the U/D counter 154 is activated to select the count-up operation. Then, the D-FF 172 generates an enable signal each time the signal /INRANGE indicative of an inranged state is rendered low in level, and hence the U/D counter 154 counts up the clock outputted from the NOR gate 164. The counted value of the U/D counter 154 is delivered to the vector RAM 46 as a write address thereof. When the U/D counter 154 counts up the clock, and the counted value of the U/D counter 154, i.e., the number of inrange-detected objects reaches 32 capable of being displayed by one line, an AND gate 186 and a D-FF 188 generate an signal INRANGE FULL. As a consequence, the inrange detection circuit 56 is inactivated in response to the signal INRANGE FULL. On the other hand, when the signal /LB is rendered low in level, the U/D counter 154 is activated to select a count-down operation, after which it counts down the clock each time the signal L is supplied from the size counter control circuit 62. In order to read out an inrange-detected object, the counted value of the U/D counter 154 is delivered to the vector RAM 46 as a read address. When all the objects are read out, the counted value of the U/D counter 154 reaches "0", and a carry signal is supplied to the D-FF 182, thereby inactivating the U/D counter 154.

When the inrange detection circuit 56 starts the operation of an inrange detection, the signal /HI generated from the timing signal generating circuit 34 is supplied to a reset input of the U/D counter 154, and is also delivered to the RS-FF 176 as the reset input thereof. If any object under the inrange state is not detected subsequently, then the output of the RS-FF 176 remains low in level. Then, the output of the RS-FF 176 passes through a D-FF 190 and a D-FF 192, which is in turn outputted as the signal /NONOBJ in response to the signal HCO generated from the timing signal generating circuit 34. The signal /NONOBJ is supplied to the buffer RAM control circuit 92 (see FIG. 6C).

Register Control Circuit 74, H Position Arithmetic Circuit 64, H-Position Register 66, V-Position Register 68, Attribute Register 70, Name Register 72 and H Position Arithmetic Circuit 76

Figure 11:
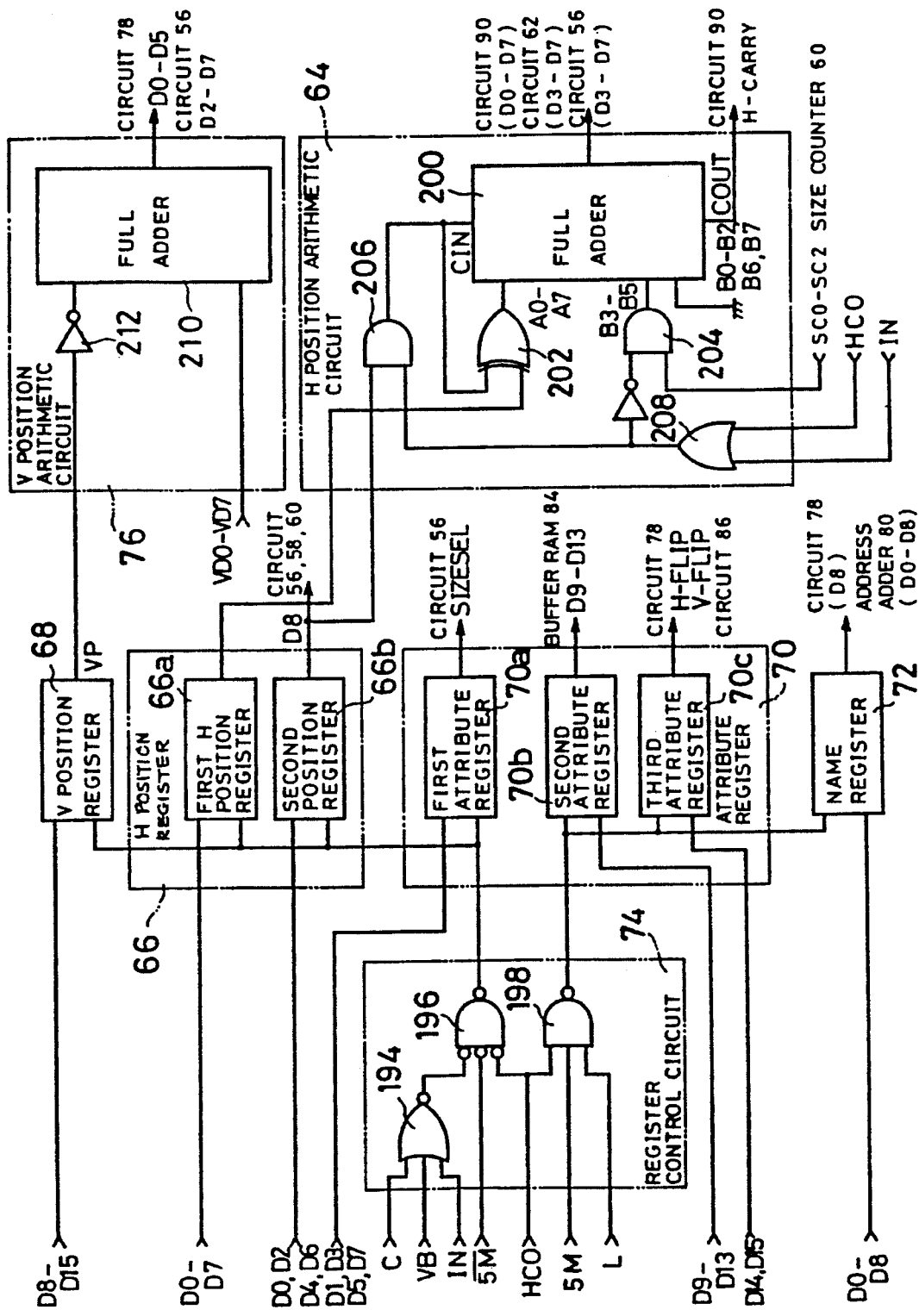
FIG. 11 is a block diagram showing, in detail, a register control circuit, an H-position register, a V-position register, an attribute register, a name register, an H position arithmetic circuit and a V position arithmetic circuit.

The register control circuit 74 shown in FIG. 11 has a NOR gate 194 and NAND gates 196, 198. The signal C outputted from the size counter control circuit 62 (see FIG. 6B) and the signals VB and IN generated from the timing signal generating circuit 34 are supplied to inputs of a NOR gate 194. Inputs of the NAND gate 196 are supplied with the output of the NOR gate 194 and the signals /5M and HCO generated from the timing signal generating circuit 34, respectively, whereas inputs of the NAND gate 198 are supplied with the signal L outputted from the size counter control circuit 62 (see FIG. 6B) and the signals 5M and HCO generated from the timing signal generating circuit 34, respectively.

The H position arithmetic circuit 64 includes a 8-bit full adder 200 to one, i.e., A0 to A7 of inputs of which is supplied with the output of an exclusive OR gate 202 and to the other, i.e., B3 to B5 of the inputs of which is supplied with the output of an AND gate 204. Incidentally, the remaining input of the above inputs of the full adder 200 is supplied with the earth potential, i.e., "0" potential. H position data D0 to D7 from a first H position register 66a of the H-position register 66 are supplied to one of inputs of the exclusive OR gate 202 together with a carry signal input CIN fed from an AND gate 206. Thus, when the carry signal input CIN is high in level, the data D0 to D7 are inverted by the exclusive OR gate 202, and the so-inverted data are supplied to the full adder 200 as the input A0 to A7 referred to above.

Additionally, the AND gate 206 is supplied with data D8 outputted from a second H position register 66b of the H-position register 66 and the output of an OR gate 208. When the data D8 is a "1", the horizontal (H) position of an object falls within a negative (minus) region as shown in FIG. 12, whereas the H position of the object falls within a positive (plus) region as illustrated in FIG. 12. Specifically, the actual screen of the monitor 22 (see FIG. 1) for displaying the object thereon corresponds to the right-handed half the entire screen as seen from the origin (0, 0) shown in FIG. 12. The horizontal position is represented in the range of "0–255", i.e., "000H–0FFH" within such a display screen. However, in the present embodiment, in order to smoothly display a portion of the object within the display screen from the left end of the screen even when the left end of the object is out of the display screen, an imaginary screen indicated by the left-handed half the entire screen of the monitor 22 is assumed even if the object is displayed beyond the range of the display screen, and the horizontal position can be set even such a range. The horizontal position is represented in the range of "256–511", i.e., "100H–1FFH" when the object is represented beyond the range of the display screen. When the H position data D8 is of "0" during an inrange detection period, the data D0 to D7 are directly supplied to the full adder 200 as the input A0 to A7 thereof. At this time, the input B3 to B5 are rendered low in level by the signal IN delivered from the timing signal generating circuit 34, which is indicative of a state of an object being under the inrange detection. Thus, the output of the full adder 200 sums to "D0–D7+0", and hence the data D0 to D7 are outputted from the full adder 200 as they are. When the H position data D8 is of "1", the data D0 to D7 are inverted by the exclusive OR gate 202, and the thus-inverted data are supplied to the full adder 200 as the input A0 to A7 thereof. At that time, the inputs B3 to B5 are fixed so as to be low in level by the signal IN referred to above. Thus, the output of the full adder 200 sums to "1+/(D0–D7)".

When the signal HCO supplied via the OR gate 208 from the timing signal generating circuit 34, is of a high level if other than the above process, either "D0–D7+0" or "D0–D7+1" of the full adder 200 is loaded into the size counter 60 (see FIG. 6B) as an initial value thereof in dependence on either "0" or "1" of the H position data D8. When the signal HCO is of a low level, the H position data D0 to D7 are delivered to the full adder 200 as the inputs A0 to A7 thereof as they are, and data SC0 to SC2 outputted from the size counter 60 are supplied to the full adder 200 as the inputs B3 to B5 thereof. Therefore, the result of addition of both data is outputted from the full adder 200.

Thus, the reason for converting the H position data into the absolute value in the H position arithmetic circuit 64 is that the object is intended to be displayed from the left end of the monitor's screen except for the portion of the object which is out of the display screen of the monitor.

Incidentally, the V position arithmetic circuit 76 includes a 8-bit full adder 210 to one, i.e., A0 to A7 of inputs of which is supplied with V position data D8 to D15 of the V-position register 68 inverted by an inverter 212, and to the other, i.e., B0 to B7 of the inputs of which is supplied with signals VD0 to VD7 from the timing signal generating circuit 34. Then, the result of addition of both inputs by the full adder 210 is supplied to the address adder control circuit 78 and the inrange detection circuit 56 (see FIG. 6B) as the vertical (V) position data of the object.

Size Register 50, Interlace Register 54, Size Decoder 52 and Inrange Detection Circuit 56

Figure 13:
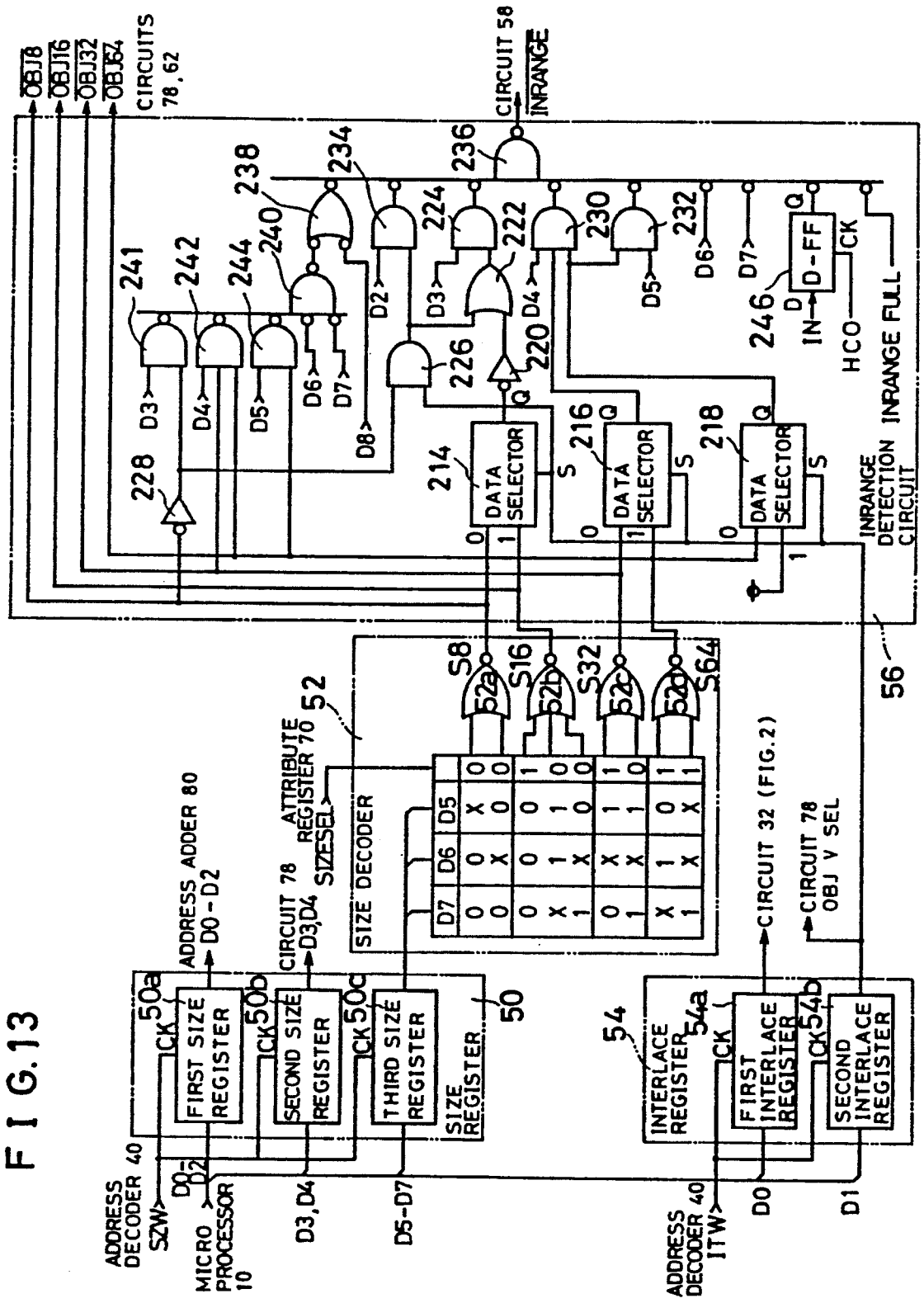
FIG. 13 is a block diagram showing, in detail, a size register, an interlace register, a size decoder and an inrange detection circuit.
Figure 14:
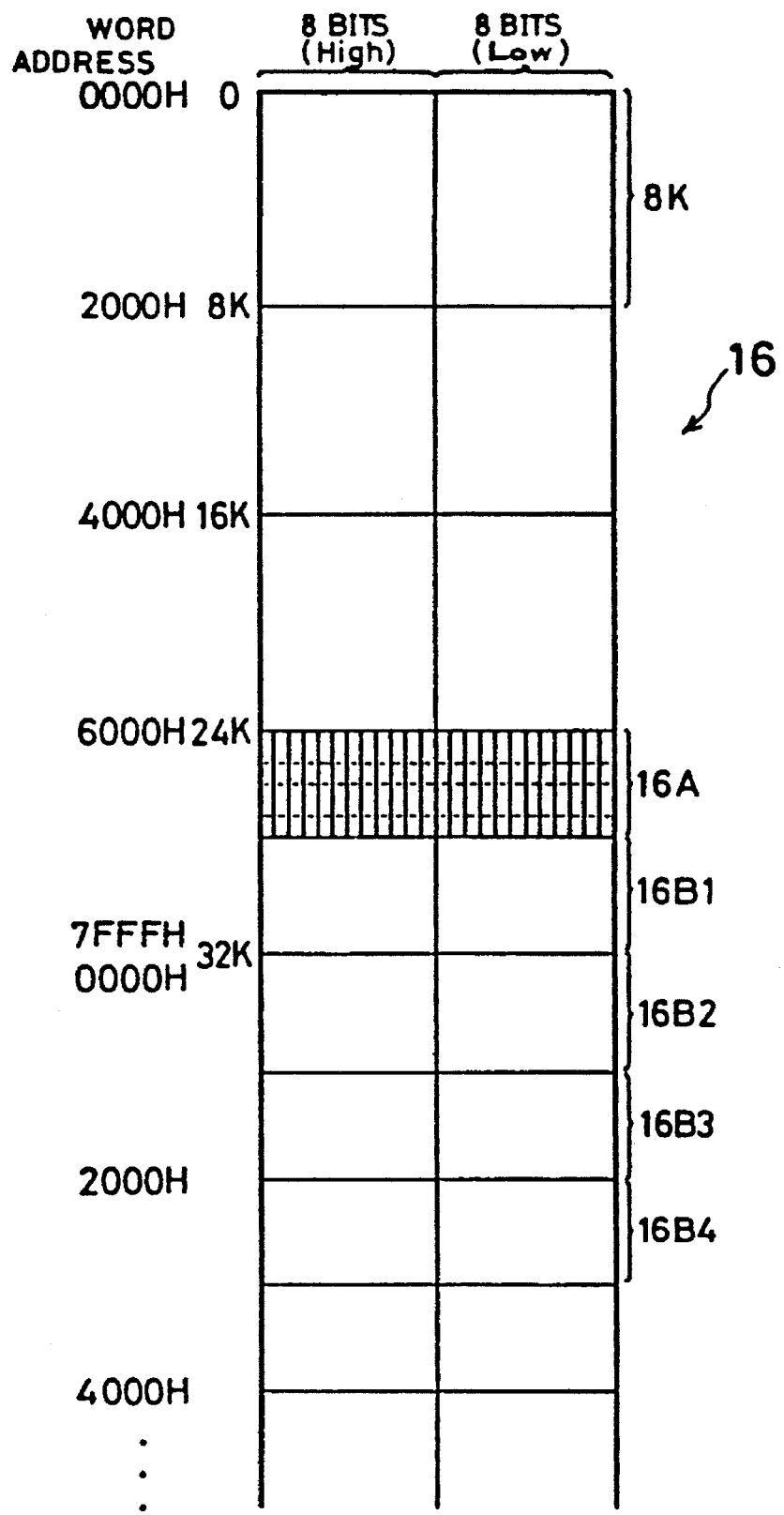

The size register 50 shown in FIG. 13 includes first, second and third size registers 50a, 50b and 50c each of which receives, as a load signal, the signal SZW outputted from the address decoder 40 (see FIG. 6A). Each of the first, second and third size registers 50a, 50b and 50c is supplied with data D0 to D7 outputted from the microprocessor 10 (see FIG. 1) via the data bus. The interlace register 54 has first and second interlace registers 54a, 54b each of which receives, as a load signal, the signal ITW delivered from the address decoder 40 (see FIG. 6A). Each of the first and second interlace registers 54a and 54b is supplied with the data D0 to D7 fed via the data bus from the microprocessor 10 (see FIG. 1). The first size register 50a is loaded with address data BASE in an object memory area, and the second size register 50b is loaded with data SEL. In addition, the third register 50c is loaded with size data SIZE. The first interlace register 54a is loaded with interlace data for making a decision as to whether either a different display or an identical display is carried out by odd-numbered fields and even-numbered fields. The second interlace register 54b is loaded with data OBJ V SEL.

The data BASE and SEL loaded into the first and second size registers 50a and 50b are used to specify addresses in the video data memory 16, for arbitrarily setting up the background pattern storage area 16a and the character data storage area 16b of the video data memory 16 (see FIG. 1) formed of a single SRAM as described above. Specifically, the video data memory 16 shown in FIGS. 14 and 15 has the storage capacity of 64K bytes (words), in which a specified 4K byte area 16A is specified by data BASE defined by data D0 to D2. In addition, other areas 16B1, 16B2, 16B3 each of which is represented in the form of 4K bytes or another area 16B4 which is also represented in the form of 4K bytes, is specified by data SEL defined by data D3 and D4. The kind of an object can be changed only by properly combining the data BASE and SEL and changing 2 bits indicative of the data SEL. More specifically, character data of an object necessary at a certain scene in a game is stored in any one of the specified area 16A and the other areas 16B1 to 16B4, and character data of an object required at other scene is stored in one of the remaining areas of the areas 16B1 to 16B4. Thus, the type of the object can easily be changed for each scene of the game by simply changing 2 bits representative of the data SEL and specifying one of the remaining areas of the areas 16B1 to 16B4 when a desired object is required.

3-bit size data D5 to D7 outputted from the third size register 50c are inputted to the size decoder 52. The size decoder 52 decodes 1-bit size selection data SIZESEL delivered from a first attribute register 70a (see FIG. 11) included in the attribute register 70 and the size data D5 to D7 so as to output size designation signals S8, S16, S32, S64 from respectively corresponding NOR gates 52a, 52b, 52c, 52d. Specifically, when the size designation signal S8 is outputted from the NOR gate 52a, an object (formed of a single unit character) represented in the form of horizontal×vertical=8×8 dots is selected. When the size designation signal S16 is outputted from the NOR gate 52b, an object (formed of four unit characters) represented in the form of horizontal×vertical=16×16 dots is selected. When the size designation signal S32 is produced from the NOR gate 52c, an object (formed of sixteen unit characters) represented in the form of horizontal×vertical=64×64 dots is chosen.

These size designation signals S8, S16, S32, S64 are supplied to the size counter control circuit 62 and the address adder control circuit 78 as signals /OBJ8, /OBJ16, /OBJ32, /OBJ64, respectively. In addition, the size designation signals S8 and S16 are supplied to a data selector 214 included in the inrange detection circuit 56, whereas the size designation signals S32 and S64 are delivered to a data selector 216. Furthermore, the size designation signal S64 is supplied to a data selector 218 as one of two inputs thereof, and the other thereof is fixed to "1". Each of the data selectors 214, 216 and 218 is supplied with interlace data as a selection signal, which is outputted from the second interlace register 54b included in the interlace register 54. The size of an object is changed at the time of interlace and non-interlace. When the density of dots is increased at the time of the interlace, for example, the size of the object is reduced. Correspondingly, a change in the size used as a criterion for the inrange detection based on the size designation signal outputted from the size decoder 52 is required. In order to execute an inrange detection operation according to the difference in size among objects, the data selectors 214 to 218 are used.

The output of the data selector 214 is inverted by an inverter 220, and the thus-inverted output is delivered to one of two inputs of an AND gate 224 through an OR gate 222. The output of an AND gate 226 is supplied via the inverter 222 to the other of the inputs of the AND gate 224. Two inputs of the AND gate 226 are supplied with the interlace designation signal delivered from the interlace register 54 and the size designation signal S8 supplied via an inverter 228 from the NOR gate 52a. V position data D3 outputted from the V position arithmetic circuit 76 is supplied to the other of the inputs of the AND gate 224.

The outputs of the data selector 216 and 218 are supplied to an AND gate 230 as two of three inputs thereof. V position data D4 outputted from the V position arithmetic circuit 76 is supplied to the AND gate 230 as the remaining input thereof. In addition, the output of the data selector 218 is supplied to an AND gate 232 together with V position data D5 generated from the V position arithmetic circuit 76. The output of the AND gate 226 is delivered to an AND gate 234 together with V position data D2 outputted from the V position arithmetic circuit 76. The respective outputs of these AND gates 224, 230, 232 and 234 are inverted together with V position data D6, D7 outputted from the V position arithmetic circuit 76, and the thus-inverted data are all supplied to an AND gate 236 as inputs thereof.

Further, the output of a NOR gate 238 is supplied to the NAND gate 236 as an input thereof. Two inputs of the NOR gate 238 are supplied with the H position data D8 outputted from the H-position register 66 and the output of a NAND gate 240, all of which are inverted. The NAND gate 240 is supplied as inputs with the outputs of NAND gates 241, 242 and 244, and the inverse of each of the H position data D6 and D7 outputted from the H-position register 66. Two inputs of the NAND gate 241 are supplied with the output of the inverter 228 used to receive the size designation signal S8, and the H position data D3 produced by the H-position register 66. In addition, three inputs of the NAND gate 242 are supplied with the H position data D4 outputted from the H-position register 66 and the size designation signals S16 and S32. Furthermore, two inputs of the NAND gate 244 are supplied with the H position data D5 outputted from the H-position register 66 and the size designation signal S64.

The output of the NOR gate 238 is used as a signal indicative of whether or not it is in an inrange state in the horizontal (H) direction. Each of the outputs of the AND gates 224, 230, 232 and 234 is used as a signal indicating whether or not each of the data D5 and D7 outputted from the V position arithmetic circuit 76 is in an inrange state in the vertical (V) direction.

Then, the inputs of the NAND gate 236 are supplied with the output of the NOR gate 238, the outputs of the AND gates 224, 230, 232, 234, the output of a D-FF 246 supplied at its data input with the signal IN outputted from the timing signal generating circuit 34 and with the signal HCO as the clock thereof, and the signal INRANGE FULL outputted from the vector RAM address circuit 58. Thus, when the signal IN is inputted but the signal INRANGE FULL is not inputted, the NAND gate 236 outputs a signal /INRANGE indicating that an object to be detected or determined is in an inrange state in the horizontal and vertical directions.

Size Counter Control Circuit 62 and Size Counter 60

Figure 16:
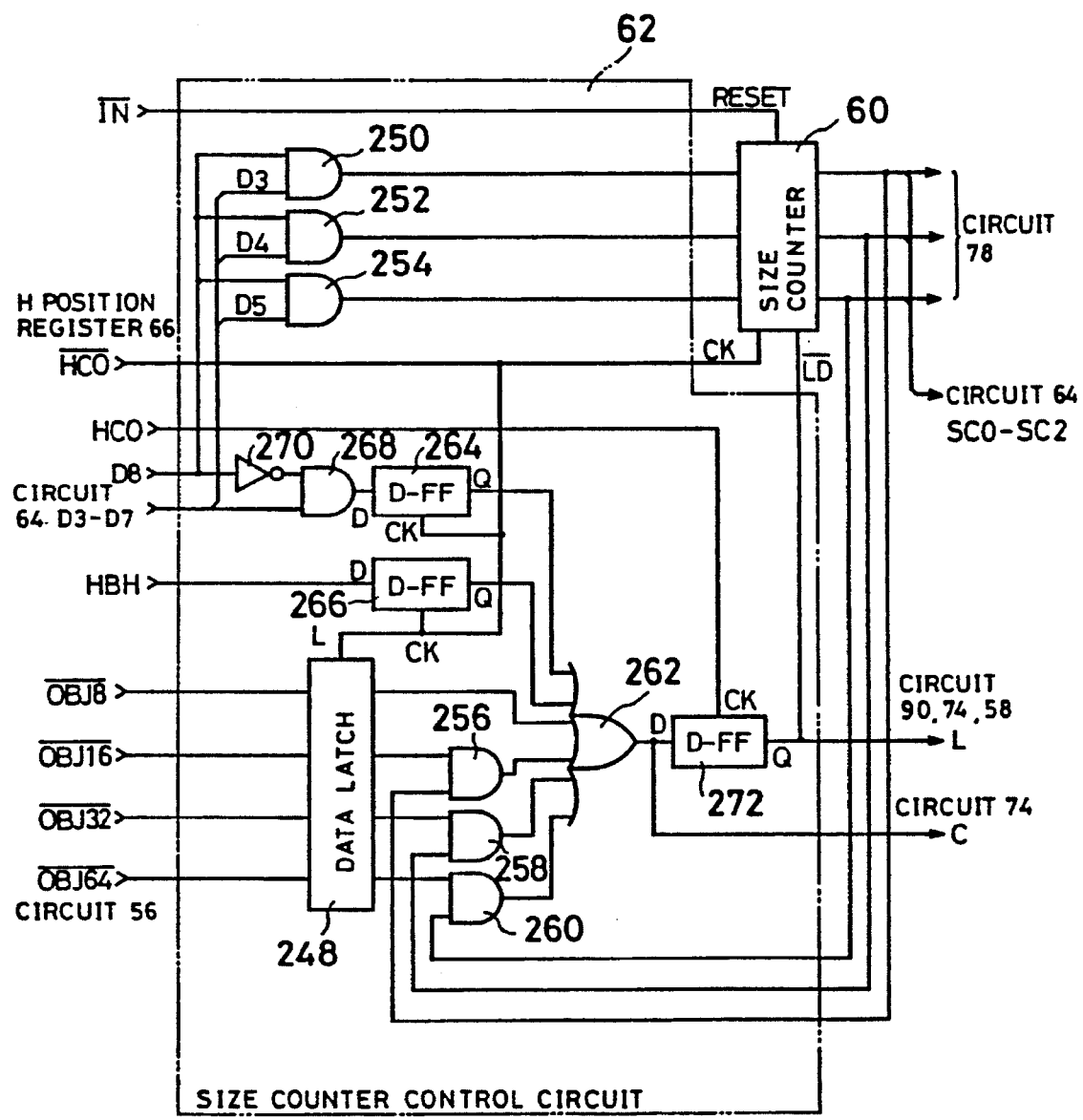
FIG. 16 is a block diagram showing a size counter control circuit in detail.

The size counter control circuit 62 shown in FIG. 16 includes a data latch 248 supplied with the object size signals /OBJ8, /OBJ16, /OBJ32 and /OBJ64 respectively outputted from the inrange detection circuit 56, i.e., from the NOR gates 52a, 52b, 52c and 52d of the size decoder 52.

Then, the H position data D8 outputted from the H-position register 66 is supplied to one of two inputs of each of AND gates 250, 252 and 254. Data D3, D4 and D5 of the absolute value data HA outputted from the H position arithmetic circuit 64 are respectively supplied to the other of the two inputs of each of the AND gates 250, 252, and 254. The output of each of the AND gates 250, 252 and 254 is supplied to the size counter 60 as an initial value thereof. When the H position data of the H-position register 66 is positive (a plus), the position for making a start in the display of the object appears somewhere in the display screen of the monitor 22 (see FIG. 1). Therefore, "0" is always inputted as the H position data D8. Thus, the output of each of the AND gates 250 to 254 is rendered low in level, and the initial value data set in the size counter 60 is brought into "0". On the other hand, when the H position data of the H-position register 66 is negative (a minus), "1" is always inputted as the H position data D8. When the H position data is of "−8", for example, the absolute value HA thereof is brought to "8", and represented in the form of binary data "1000". Thus, the D3 of the absolute value HA is rendered high in level, and the output of the AND gate 250 is also rendered high in level. Hence, "1" is set to the size counter 60 as an initial value. As a shift in the negative direction increases, the absolute value HA, i.e., the initial value set to the size counter 60 is increased.

The signal /HCO delivered from the timing signal generating circuit 34 is supplied to the size counter 60 as a clock thereof. Thus, the size counter 60 increments the initial value set in the above-described manner for each signal /HCO. Incidentally, the signal /IN outputted from the timing signal generating circuit 34 is supplied to the size counter 60 as a reset input thereof, and hence the size counter 60 does not count during an interval in which the inrange detection circuit 56 is performing an inrange detection process.

Then, the output data SC of the size counter 60 are supplied to the address adder control circuit 78 as mentioned above and one of two inputs of each of AND gates 256, 258 and 260. The signals /OBJ16, /OBJ32 and /OBJ64 which have been latched in the data latch 248 are supplied to the other of the two inputs of each of the AND gates 256, 258 and 260. In addition, the output of each of the AND gates 256, 258 and 260 is supplied to a NOR gate 262 together with the signal /OBJ8 which has been latched in the data latch 248. The outputs of D-FFs 264 and 266 are supplied to respectively corresponding inputs of the NOR gate 262. The output of an AND gate 268 is supplied to one of two inputs of the D-FF 264, whereas the signal HBH from the timing signal generating circuit 34 is delivered to one of two inputs of the D-FF 266. The AND gate 268 receives the data D3 to D7 from the H position arithmetic circuit 64, and the H position data D8 from the H-position register 66, which has been inverted by an inverter 270. The signal /HCO delivered from the timing signal generating circuit 34 is supplied as a clock to each of the D-FFs 264 and 266 in a manner similar to each latch signal of the data selector 248. The output of the NOR gate 262 is supplied to a D-FF 272 as a data input thereof and to the register control circuit 74 as a signal C. In addition, the signal HCO from the timing signal generating circuit 34 is delivered to the D-FF 272 as a clock thereof.

Address Adder Control Circuit 78

Figure 17:
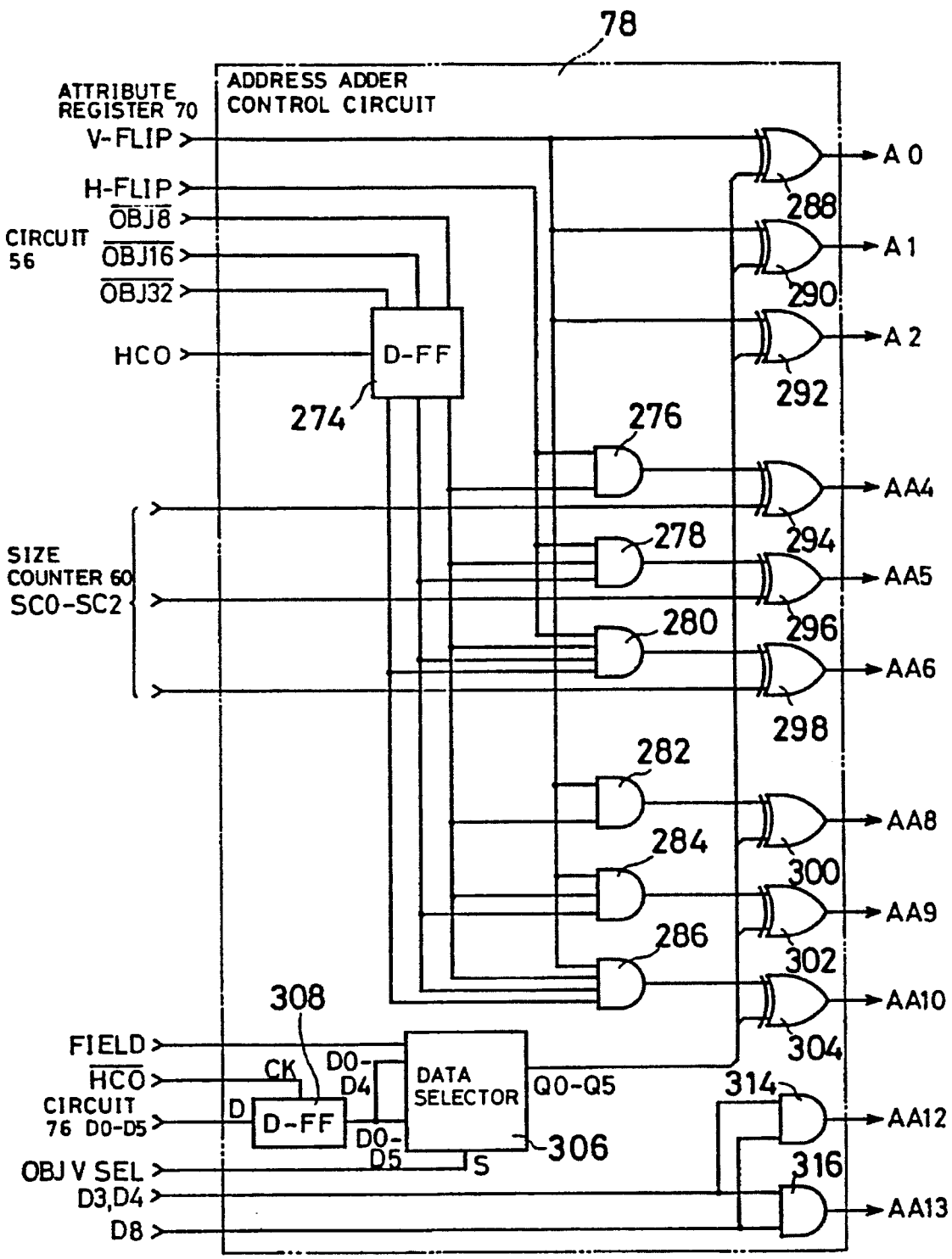
FIG. 17 is a block diagram depicting an address adder control circuit in detail.

The address adder control circuit 78 shown in FIG. 17 includes a D-Ff 274 for receiving the object size signals /OBJ8, /OBJ16 and /OBJ32 respectively delivered from the inrange detection circuit 56, i.e., from the NOR gates 52a, 52b, 52c of the size decoder 52. The signal HCO delivered from the timing signal generating circuit 34 is supplied to the D-FFs 274 as a clock thereof. The signal /OBJ8 outputted from the D-FFs 274 is supplied to one of inputs of each of AND gates 276, 278, 280, 282, 284 and 286. The signal /OBJ16 from the D-FFs 274 is delivered to another one of the inputs of each of the AND gates 278, 280, 284 and 286. The signal /OBJ32 from the D-FFs 274 is supplied to further one of the inputs of each of the AND gates 280 and 286. Data H-FLIP delivered from the attribute register 70 is supplied to the remaining inputs of the AND gates 276, 278 and 280, whereas data V-FLIP from the attribute register 70 is supplied to the remaining inputs of the AND gates 282, 284 and 286. The data V-FLIP from the attribute register 70 is further delivered to one of two inputs of each of exclusive OR gates 288, 290 and 292. The output of each of the AND gates 276, 278 and 280 is supplied to one to two inputs of each exclusive OR gates 294, 296 and 298 together with the data SC0 to SC2 outputted from the size counter 60. The output of each of the AND gates 282, 284 and 286 is supplied to one of two inputs of each of exclusive OR gates 300, 302 and 304. The output of a 6-bit data selector 306 is fed to the other of the two inputs of each of the exclusive OR gates 288, 290, 292, 300, 302 and 304.

The data selector 306 is supplied with the signal FIELD delivered from the timing signal generating circuit 34, and the output of a D-FF 308 for receiving the data D0 to D5 from the V position arithmetic circuit 76 each of which is indicative of the difference or distinction between the V position and the scanning line number. The signal /HCO outputted from the timing signal generating circuit 34 is supplied to the D-FF 308 as a clock thereof. The D-FF 308 supplies data D0 to D4 to one of inputs of the data selector 306, and also supplies data D0 to D5 to the other of the inputs thereof. Then, the data selector 306 selectively outputs both inputs applied from the D-FF 308 in response to the data OBJ V SEL delivered from the interlace register 54, and then supplies the so-selected output to each of the exclusive OR gates 288, 290, 292, 300, 302 and 304.

The address adder control circuit 78 mainly alters an address at the time of execution of the H inversion and/or the V inversion shown in FIGS. 18A through 18D. Referring to FIG. 18A, data H-FLIP and V-FLIP are both of "0", and the H inversion and V inversion are not carried out. Referring to FIG. 18B, data H-FLIP is of "1" and data V-FLIP is of "0". Thus, the H inversion is executed about the vertical axis 310 but the V inversion is not carried out. Referring to FIG. 18C, data H-FLIP is of "0" and data V-FLIP is of "1", and hence the H inversion is not performed but the V inversion is made about the horizontal axis 312. Referring to FIG. 18D, data H-FLIP and V-FLIP are both of "1", and the H and V inversions are made about the vertical and horizontal axes 310 and 312, respectively.

Returning now to FIG. 17, since the H- or V-inverted distance changes according to the size of an object, the signals /OBJ8, /OBJ16 and /OBJ32 outputted from the size decoder 52 are supplied to the respectively corresponding AND gates 276, 278, 280, 282, 284 and 286 as their inputs. When the object is represented in sizes of 8×8, the signal /OBJ8 is of a low level. Therefore, the output of each of the AND gates 276, 278, 280, 282, 284 and 286 is rendered low in level. Thus, the exclusive OR gates 294, 296 and 298 respectively output the size data SC0 to SC2 delivered from the size counter 60 as additive addresses AA4, AA5 and AA6 as they are, so-that each address is not inverted. When the object is represented in sizes of 16 ×16, the signal /OBJ16 is rendered low in level. As a consequence, only the AND gates 276 and 282 are activated, and the output of each of the remaining AND gates 278, 280, 284 and 286 is rendered low in level. If the data H-FLIP is of "1" at this time, then the size data SC0 outputted from the size counter 60 is inverted by the exclusive OR gate 294 so as to be outputted as the additive address AA4. When the object is built in sizes of 32×32, the signal /OBJ32 is rendered low in level, thereby activating the AND gates 276, 278, 282 and 284 so as to render the output of each of the remaining AND gates 280 and 286 low in level. If the data H-FLIP is of "1" at this time, then the size data SC0 and SC1 delivered from the size counter 60 are inverted by the exclusive OR gates 294 and 296 respectively so as to be outputted as the additive addresses AA4 and AA5. When the object is built in sizes of 64×64, the signals /OBJ8, /OBJ16 and /OBJ32 are rendered high in level, thereby activating all the AND gates 276, 278, 280, 282, 284, 286. If the data H-FLIP is of "1" at this time, then the size data SC0 to SC2 outputted from the size counter 60 are inverted by the exclusive OR gates 294, 296, 298 respectively so as to be outputted as the additive addresses AA4 to AA6.

In the case of the V inversion, the inversion of the three lower, i.e., rightmost bits of addresses delivered to the video data memory/address circuit 82 shows the inversion per horizontal line, and the inversion of the three higher, i.e., leftmost bits thereof represents the inversion for each character. Since the three rightmost bits are not related to the size of the object, each of the exclusive OR gates 288, 290 and 292 inverts or makes noninverse the data delivered from the data selector 306 in response to either "1" or "0" of the data V-FLIP so as be outputted as the three rightmost bits A0, A1 and A2 of the addresses to be delivered to the video data memory/address circuit 82. In addition, the three leftmost bits are processed in the same manner as the process of the previous H inversion. Specifically, each of the AND gates 282, 284 and 286 establishes conditions of an object for each size, and each of the exclusive OR gates 300, 302 and 304 inverts or makes noninverse the data outputted from the data selector 306 according to such conditions in correspondence to either "1" or "0" of the data V-FLIP so as to be outputted as the three leftmost bits AA8, AA9 and AA10 delivered to the address adder 80.

AND gates 314 and 316 included in the address adder control circuit 78 output additive addresses AA12 and AA13 respectively. However, such addresses AA12 and AA13 are used to specify any one of the areas 16B1 to 16B4 previously illustrated in FIGS. 14 and 15.

Address Adder 80, Video Data Memory/Address Circuit 82 and Video Data Memory 16

Figure 19:
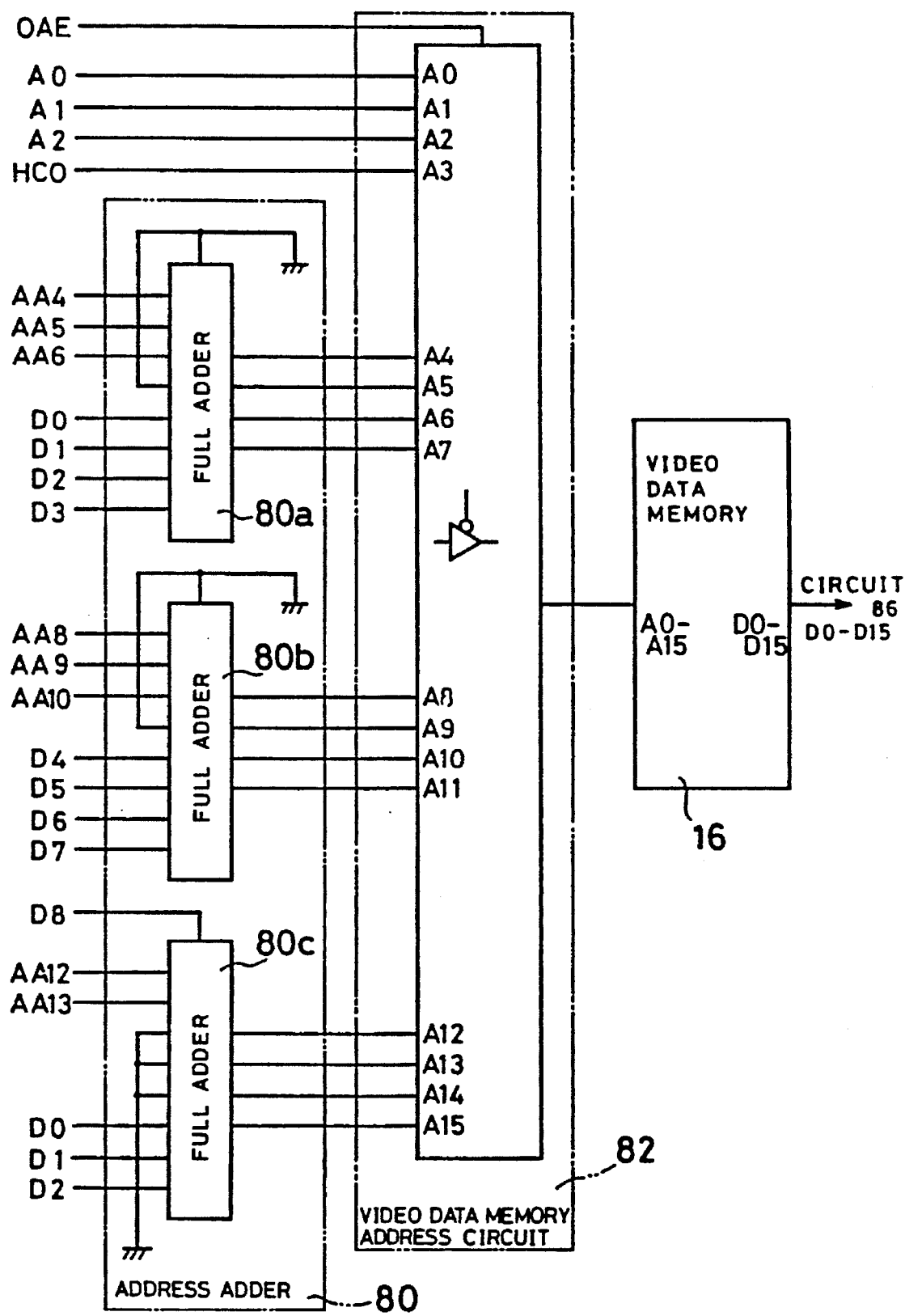
FIG. 19 is a block diagram illustrating, in detail, an address adder, a video data memory/address circuit and a video data memory.

The address adder 80 illustrated in FIG. 19 includes three 4-bit full adders 80a, 80b and 80c. The outputs of these fll adders 80a, 80b and 80c are supplied to the video data memory/address circuit 82 as addresses A4 to A15. The addresses A0 to A2 outputted from the address adder control circuit 78 are supplied to the video data memory/address circuit 82 as addresses A to A2 thereof, whereas the signal HCO delivered from the timing signal generating circuit 34 is supplied to the video data memory/address circuit 82 as an address A3 thereof. Incidentally, the data BASE of the first size register 50a (see FIG. 13) of the size register 50 makes a decision as to which input bits in the full adders 80a to 80c are fixed to the earth potential. In addition, addresses A0 to A15 in the video data memory 16 are specified by the video data memory/address circuit 82, and data D0 to D15 outputted from the video data memory 16 are supplied to the H flip circuit 86.

H FLIP Circuit 86 and Color Data Extraction Circuit 88

The H flip circuit 86 shown in FIG. 20 includes a data selector 318 supplied with the data D0 to D15 outputted from the video data memory 16. The data selector 318 has 16 data selectors each of which selects one of 2-bit inputs so as to output the same in the form of 1-bit. The output of a D-FF 320 is supplied to the data selector 318 as a selection signal thereof. The data H-FLIP is supplied to a data input of the D-FF 320, and the signal /HCO outputted from the timing signal generating circuit 34 is supplied to the D-FF 320 as a clock thereof. The data selector 318 outputs data in accordance with the following table II in response to the selection signal delivered from the D-FF 320.

TABLE II

| | D7 | | | | | | | D0 |
|---|---|---|---|---|---|---|---|---|
| S = 0 | 7 | 6 | 5 | 4 | 3 | 2 | 1 | 0 |
| S = 1 | 0 | 1 | 2 | 3 | 4 | 5 | 6 | 7 |
| | D15 | | | | | | | D8 |
| S = 0 | 15 | 14 | 13 | 12 | 11 | 10 | 9 | 8 |
| S = 1 | 8 | 9 | 10 | 11 | 12 | 13 | 14 | 15 |

Thus, the H flip circuit 86 inverts the graphic data outputted from the video data memory 16 in the form of 8 bits according to whether or not the inverse instruction H-FLIP in the horizontal (H) direction is inputted. The graphic data outputted from the H flip circuit 86 is supplied to the color data extraction circuit 88.

The color data extraction circuit 88 comprises four data selectors, i.e., a first data selector 322, a second data selector 324, a third data selector 326 and a fourth data selector 328. Each of the data selectors 322, 324, 326 and 328 selects any one of 8 bit inputs and outputs only one bit thus selected. The signals HPO, 5M and HCO outputted from the timing signal generating circuit 34 are supplied to each of the first data selector 322, the second data selector 324, the third data selector 326 and the fourth data selector 328 as their selection signals. The graphic data outputted from the H flip circuit 86 is supplied to each of 16-bit D-FFs 330 and 332, and the output of the D-FFs 332 is supplied to a D-FFs 334. The signal /HCO outputted from the timing signal generating circuit 34 is applied to each of the D-FFs 330 and 334 as clocks thereof, whereas the signal HCO outputted from the timing signal generating circuit 34 is supplied to the D-FFs 332 as a clock thereof. In addition, the signal LBR outputted from the timing signal generating circuit 34 is supplied to a data input of a-D-FF 336, whereas the signal 5M from the timing signal generating circuit 34 is supplied to the D-FF 336 as a clock thereof. The output of the D-FF 336 is delivered to each of the D-FFs 330 and 334 as a reset input thereof.

The D-FFs 332 holds the first 16 bits of the graphic data outputted from the H flip circuit 86 in response to the signal HCO. In addition, the D-FFs 330 holds the following 16 bits in response to the signal HCO. At this time, the first 16 bits, which have been held by the D-FFs 332, are shifted to the D-FFs 334 in response to the signal /HCO. Thus, the graphic data of 32 bits in total are supplied 8 bits by 8 bits to the first data selector 322, the second data selector 324, the third data selector 326 and the fourth data selector 328 as input data thereof. Each of the data selectors 322, 324, 326 and 328 selects one bit in accordance with the following table III so as to output color cell data of 4 bits in total. Thus, the color data extraction circuit 88 specifies or designates four color cells.

TABLE III

| HPO | 0 | 0 | 0 | 0 | 1 | 1 | 1 | 1 |
|---|---|---|---|---|---|---|---|---|
| HCO | 0 | 0 | 1 | 1 | 0 | 0 | 1 | 1 |
| 5M | 0 | 1 | 0 | 1 | 0 | 1 | 0 | 1 |
| Q0 | I7 | I5 | I3 | I1 | I6 | I4 | I2 | I0 |
| Q1 | I6 | I4 | I2 | I0 | I7 | I5 | I3 | I1 |

Buffer RAM 84

The buffer RAM 84 shown in FIG. 6C includes a first buffer RAM 84a and a second buffer RAM 84b each of which has the storage capacity of 128 by 9 bits (i.e., 9 bits×128). A single buffer RAM may normally be used as the buffer RAM 84. However, the present embodiment shows a case in which the buffer RAM is made up of two VRAMs. In this case, odd-numbered dots are stored in the first buffer RAM 84a, whereas even-numbered dots are stored in the second buffer RAM 84b. More specifically, the data selectors 322, 324, 326 and 328 of the color data extraction circuit 88 selectively output data 0D0 to 0D3 indicative of the odd-numbered dots and data 1D0 to 1D3 indicative of the even-numbered dots respectively in response to the signal HCO outputted from the timing signal generating circuit 34. The thus-outputted data 0D0 to 0D3 and 1D0 to 1D3 are respectively supplied to the first and second buffer RAMs 84a and 84b as data input thereof.

When it is desired to read desired data from the buffer RAM 84, the data are firstly read from a first output latch 338a and a second output latch 338b at a time, and the so-read data are then supplied to the composition circuit 28 (see FIG. 2).

Buffer RAM Address Circuit 90 and Buffer RAM Control Circuit 92

Figure 22:
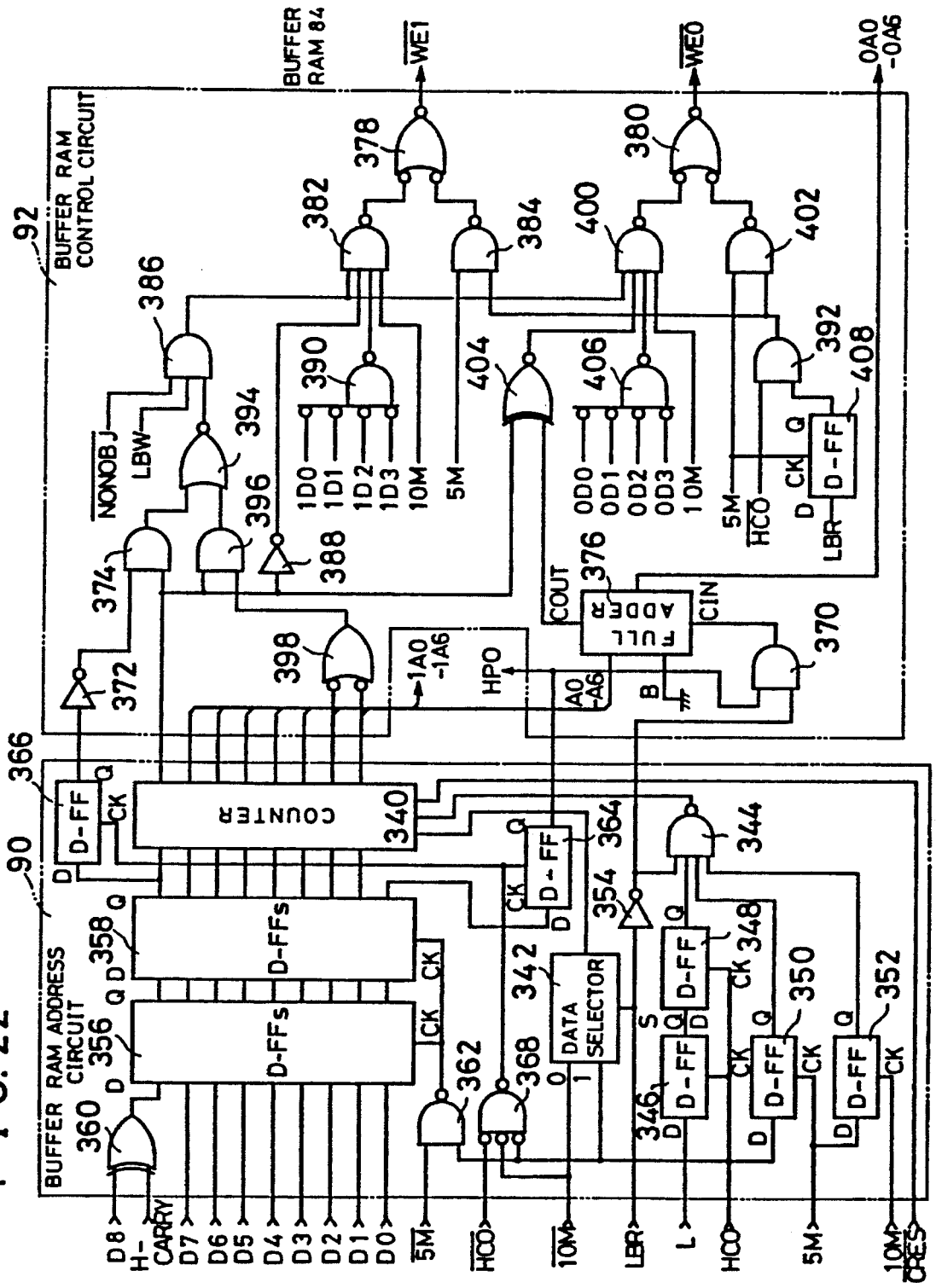
FIG. 22 is a block diagram illustrating a buffer RAM address circuit and a buffer RAM control circuit in detail.

The buffer RAM address circuit 90 shown in FIG. 22 includes a 8-bit counter 340. The output of the counter 340 is supplied to the buffer RAM control circuit 92 as address data for the buffer RAM 84. The counter 340 is supplied as a reset input thereof with the signal /CRES outputted from the timing signal generating circuit 34 immediately before a data display period. The counter 340 is supplied with the output of a data selector 342 as a clock thereof. The signals /10M and HCO outputted from the timing signal generating circuit 34 are supplied to two inputs of the data selector 342, and the signal LBR outputted from the timing signal generating circuit 34 is supplied to the data selector 342 as a selection signal. Thus, the counter 340 performs a change in a clock when data is written into the buffer RAM 84 and a change in a clock when data is read from the buffer RAM 84. Described specifically, when the data is written into the buffer RAM 84, the counter 340 is incremented in response to the signal /10M. When the data is read from the buffer RAM 84, the counter 340 is incremented in response to the signal HCO. Thus, when the reading of the data from the buffer RAM 84 is performed, the counter 340 is incremented by 1 for every 2 dots.

In addition, the signal L outputted from the size counter 60 is supplied to a data input of a D-FF 346. The signal HCO fed from the timing signal generating circuit 34 is supplied to the D-FF 346 as a clock thereof. The output of the D-FF 346 is delivered to a D-FF 348 as a clock, which receives the HCO outputted from the timing signal generating circuit 34. Further, the signal HCO from the timing signal generating circuit 34 is inputted to a data input of a D-FF 350. The signal 5M fed from the timing signal generating circuit 34 is applied to a clock input of the D-FF 350 and supplied to a data input of a D-FF 352. The signal 10M outputted from the timing signal generating circuit 34 is supplied to the D-FF 352 as a clock thereof. Then, the outputs of the D-FFs 348, 350, 352 are supplied to respectively corresponding inputs of a NAND gate 344 together with the signal LBR fed from the timing signal generating circuit 34, which has been inverted by an inverter 354. The output of the NAND gate 344 is supplied to the counter 340 as a load signal input /LD thereof. Thus, the load timing of the counter 340 depends upon the signal L, i.e., the size of an object.

Incidentally, the counter 340 is supplied as initial values thereof with the outputs of a 9-bit D-FFs 356 for receiving the absolute value data D0 to D7 delivered from the H position arithmetic circuit 64 and accepting the output of an exclusive OR gate 360 as D8, i.e., with the outputs of a D-FFs 358. The absolute value data D8 outputted from the H-position register 66 and the carry signal H-CARRY outputted from the H position arithmetic circuit 64 are supplied to the exclusive OR gate 360 as inputs thereof. Accordingly, the inverse of the data D8 fed from the H-position. register 66 is supplied to the D-FFs 356 as the data input D8 thereof when the carry signal is inputted. The output of a NAND gate 362 used to receive the signals /5M and HCO outputted from the timing signal generating circuit 34 is supplied to each of the D-FFs 356 and 358 as a clock thereof.

Then, the outputs D0 and D8 of the D-FFs 358 are respectively supplied to D-FFs 364 and 366 as data inputs thereof. The output of a NAND gate 368 used to receive the signals /HCO, /10M and HCO outputted from the timing signal generating circuit 34 is supplied to each of the D-FFs 364 and 366 as its clock. The output of the D-FF 364 is delivered to the previously-described color data extraction circuit 88 as a signal HPO, and supplied to an AND gate 370 included in the buffer RAM control circuit 92. In addition, the output of the D-FF 366 is supplied to an AND gate 374 via an inverter 372 included in the buffer RAM control circuit 92.

The buffer RAM control circuit 92 includes a 7-bit full adder 376. The full adder 376 is supplied as inputs A0 to A6 thereof with data D1 to D7 outputted from the counter 340 in the buffer RAM address circuit 90. The full adder 376 is supplied as the remaining input B thereof with the earth potential, i.e., "0". In addition, the full adder 376 is supplied with the output of the AND gate 370 as a carry input. The full adder 376 outputs data, as addresses 0A0 to 0A6 of each of the first and second buffer RAMs 84a and 84b in the buffer RAM 84, to each of the first and second buffer RAMs 84a and 84b. When a first line as an initial H line indicative of an object is represented by ever-numbered dots, for example, the counter 340 outputs data to the above respective buffer RAMs as the addresses 0A0 to 0A6 as they are. When it is represented by over-numbered dots, total data obtained by incrementing the respective data of the counter 340 by 1 using the full adder 376 are outputted to the respective buffer RAMs as the addresses 0A0 to 0A6.

Write signals /WE0 and /WE1 to be delivered to the first and second buffer RAMs 84a and 84b (see FIG. 21) of the buffer RAM 84 are obtained from NOR gates 378 and 380 respectively.

The outputs of two NAND gates 382 and 384 are supplied to the inputs, respectively, of a NOR gate 378. The NAND gate 382 is supplied with the output of each of an AND gate 386, an inverter 388 and a NAND gate 390 and the signal 10M outputted from the timing signal generating circuit 34.

The signal 5M fed from the timing signal generating circuit 34 and the output of an AND gate 392 are respectively supplied to two inputs of the NAND gate 384. The signal LBW outputted from the timing signal generating circuit 34, the signal /NONOBJ delivered from the vector RAM address circuit 58 and the output of a NOR gate 394 are respectively fed to three inputs of the AND gate 386. The NAND gate 390 is inputted with the inverse of each of the outputs 1D0 to 1D3 fed from the color data extraction circuit 88. The NOR gate 394 is supplied with the output of the AND gate 374 and the output of an AND gate 396. In addition, the AND gate 396 is supplied with the output D8 of the counter 340 applied even to the inverter 388 and the output of an OR gate 398. Then, the OR gate 398 receives the inverse of each of the outputs D1 and D2 of the counter 340.

The output of each of two NAND gates 400 and 402 is supplied to each of two inputs of the NOR gate 380. The NAND gate 400 is supplied with the output of each of the AND gate 386, an exclusive NOR gate 404 and a NAND gate 406 and the signal 10M outputted from the timing signal generating circuit 34. Inputted to two inputs of the exclusive NOR gate 404 are a carry signal outputted from the full adder 376 and the output D8 of the counter 340. The NAND gate 406 is supplied as each input thereof with the inverse of each of the outputs 0D0 to 0D3 delivered from the color data extraction circuit 88. The signal 5M outputted from the timing signal generating circuit 34 and the output of the AND gate 392 are supplied to two inputs of the NAND gate 402. The signal /HCO outputted from the timing signal generating circuit 34 and the output of a D-FF 408 are supplied to two inputs of the AND gate 392. The signals LBR and 5M outputted from the timing signal generating circuit 34 are respectively supplied to a data input and a clock input of the D-FF 408.

In this way, the data are respectively written into the first buffer RAMs 84b and 84a in response to the signals /WE1 and /WE0 outputted from the two NOR gates 378 and 380.

GENERAL OPERATIONS

Initial State and Vertical Blanking Period

The microprocessor 10 sets up a 9-bit OAM address to the OAM address register 36 (see FIG. 6A). At this time, address data and a write signal for specifying the OAM address register 36 are inputted from the microprocessor 10. As a result, the address decoder 40 outputs the signal OAW referred to above. At the same time, the microprocessor 10 outputs data indicative of an initial address. Therefore, the microprocessor 10 sets the initial address to the OAM address register 36 in response to the signal OAW. The value of the initial address from the OAM address register 36 and the signal OAW from the address decoder 40 are inputted to the OAM address circuit 42. Then, the signal OAW is delayed in the OAM address circuit 42 and thereafter used as a load signal for an internal counter (to be described later). Therefore, the value of an initial address for the OAM 38, which is delivered from the microprocessor 10, is also set to the OAM address circuit 42 with its value being delayed a small amount with respect to that of the initial address of the OAM address register 36.

Then, the microprocessor 10 writes object data into the OAM 38. At this time, the microprocessor 10 first outputs an address, data and a write signal. Since the address selection circuit 44 (see FIG. 6B) receives the signal VB from the timing signal generating circuit 34, an address output terminal of the OAM address circuit 42 and an address input terminal of the OAM 38 are electrically connected to each other during the vertical blanking period. The address decoder 40 outputs the signal /ODW in response to the address data and the write signal fed from the microprocessor 10. Then, the OAM control circuit 48 latches therein data fed from the microprocessor 10 in response to the signal /ODW. Thereafter, the thus latched data is supplied to a data input DI of the OAM 38, and a write/enable signal WE/CE is inputted to the OAM 38. Thus, the object data outputted via the OAM control circuit 48 from the microprocessor 10 is written into the address in the OAM 38 specified by the OAM address circuit 42. Thereafter, the OAM address circuit 42 sequentially increments addresses as described above. Thus, object data from the microprocessor 10 are successively written into respectively corresponding addresses.

Then, the microprocessor 10 loads size data into the size register 50 (see FIG. 6A). At this time, the microprocessor 10 outputs address data and a write signal for specifying the size register 50, and hence the address decoder 40 outputs the signal SZW referred to above. At the same time, the microprocessor 10 has already outputted the size data previously shown by Table I, thereby setting up the size data to the size register 50 in response to the signal SZW.

Then, the microprocessor 10 loads 2-bit interlace data into the interlace register 54 (see FIG. 6A). In this case, the microprocessor 10 outputs address data and a write signal for specifying the interlace register 54. As a result, the aforementioned signal ITW is outputted from the address decoder 40. At the same time, the microprocessor 10 have already outputted the interlace data and the OBJ V SELECT, thereby setting these data to the interlace register 54 in response to the signal ITW.

Horizontal Scanning Period I

The inrange detection circuit 56 performs inrange detection during the horizontal scanning period I so as to write an OAM address of an object being in an inrange state into the vector RAM 46.

Specifically, the vector RAM address circuit 58 (see FIG. 6B) is reset in response to the signal HI outputted from the timing signal generating circuit 34 immediately before the horizontal scanning is initiated. Thus, a vector RAM address is set to "0". The object priority data, which has been loaded into the OAM address register 36, is supplied to the address counter 96 (see FIG. 8) of the OAM address circuit 42. When the object priority data is of "0", the address counter 94 (see FIG. 8) of the OAM address circuit 42 is reset, so that an OAM address is set to "0". When the object priority data is of "1", the address counter 94 of the OAM address circuit 42 is not reset. Thus, finally-loaded data is held as the initial value of the address counter 94. When it is desired to make a decision or determination as to whether or not an object is in an inrange state, the object, which has previously been subjected to the determination that it is in an inrange state, is displayed on the screen of the monitor 22 (see FIG. 1) in preference to another object subsequently subjected to the determination that it is in an inrange state. It is therefore possible to change the initial value of the OAM address at the time of the inrange detection operation using such a method and hence change the priority level of the object.

Described more specifically, the address selection circuit 44 (see FIG. 6B) connects the address output terminal of the OAM address circuit 42 to the address input terminal of the OAM 38 in response to the signal IN outputted from the timing signal generating circuit 34 during an interval in which the inrange detection circuit 56 is performing an inrange detection process. In addition, the OAM control circuit 48 supplies an enable signal to the OAM 38 at all times during a period other than the vertical blanking period. Therefore, the OAM 38 reads OAM data according to the address data outputted from the OAM address circuit 42 and the enable signal fed from the OAM control circuit 48. The H-position register 66, the V-position register 68, the attribute register 70 and the name register 72 are loaded with the H position data, the V position data, the attribute data and the name data (object designation code) of the data outputted from the OAM 38, respectively in response to the load signal outputted from the register control circuit 74.

The H position data outputted from the H-position register 66 is supplied to the H position arithmetic circuit 64. As has previously been described with reference to FIG. 12, if the most significant bit of the H position data is of "0", i.e., the H position is represented in the range of "0–255", then the H position data is supplied to the inrange detection circuit 56 as it is. If the most significant bit of the H position data is of "1", i.e., the H position is represented in the range of "–256–1" contrary to this, then the H position arithmetic circuit 64 calculates "the 2s complement" (absolute value) of the H position, and thereafter supplies the result of its calculation to the inrange detection circuit 56.

The V position arithmetic circuit 76 receives the signal V from the timing signal generating circuit 34. Then, the V position arithmetic circuit 76 subtracts the V position data VP outputted from the V-position register 68 from the vertical position data of a line indicated by the signal V, and thereafter supplies the result of its subtraction to the inrange detection circuit 56.

At this time, the inrange detection circuit 56 makes a decision as to whether or not an object to be determined is in an inrange state, based on the H position data of the H position arithmetic circuit 64 corrected as needed, the data of the V position arithmetic circuit 76 indicative of the result of its subtraction, the size selection data outputted from the attribute register 70, the size data outputted from the size register 50 and the data OBJ V SEL fed from the interlace register 54. If it is determined to be positive, the inrange detection circuit 56 supplies the signal /INRANGE to the vector RAM address circuit 58.

The vector RAM address circuit 58 supplies a write signal to the vector RAM 46 in response to the signal /INRANGE from the inrange detection circuit 56. The vector RAM 46 receives the write signal and address data from the vector RAM address circuit 58 and the data (OAM address) from the address selection circuit 44 so as to store the data DI therein. After the vector RAM address circuit 58 has outputted the write signal to the vector RAM 46, each address in the vector RAM 46 is correspondingly incremented.

In response to the signal HCO outputted from the timing signal generating circuit 34, the OAM address circuit 42 increments the value of the OAM address thereof by "+1". The inrange detection circuit 56 hereafter makes a decision as to whether or not the next object is in an inranged state in the same manner as described above. Thereafter, an address of the OAM 38 for object data of an object in the inrange state is loaded into the vector RAM 46.

As previously described, the OAM address circuit 42 is reset in accordance with the object priority data of the OAM address register 36. However, when the OAM address circuit 42 is reset, the OAM address changes from "0" to "127".

When the OAM address circuit 42 is not reset, the OAM address is incremented "+1" by "+1" starting from "a finally-set address". Then, the OAM address changes from "127" to "0", thereby resulting in "a finally-set address −1".

The above inrange detection process is carried out 128 times during an interval in which one line is being scanned in the monitor 22 (see FIG. 1). However, the number of objects capable of being displayed by one line is of 32. Thus, when the number of objects subjected to the inranged state reaches "32", the vector RAM address circuit 58 supplies the signal INRANGE FULL to the inrange detection circuit 56, thereby prohibiting the signal /INRANGE of the inrange detection circuit 56 from being outputted to the vector RAM address circuit 58.

Horizontal Blanking Period

During the horizontal blanking period, graphic data of an object while being in an inranged state is stored in the buffer RAM 84.

The timing signal generating circuit 34 supplies the signal HB to the vector RAM address circuit 58 during the H blanking period. The count mode of the U/D counter 154 (see FIG. 10) in the vector RAM address circuit 58 is changed from a count-up mode to a count-down mode in accordance with the signal HB. In addition, the vector RAM address circuit 58 decrements each address therein in response to the signal HBH outputted from the timing signal generating circuit 34, and hence a vector RAM address at which an OAM address of finally-set object data is stored is supplied to the vector RAM 46.

The vector RAM 46 receives an address from the vector RAM address circuit 58 so as to generate a desired OAM address. The address selection circuit 44 supplies an address of the vector RAM 46 to the address input terminal of the OAM 38 in response to the signals IN and VB outputted from the timing signal generating circuit 34.

The H-position register 66, the V-position register 68, the attribute register 70 and the name register 72 are loaded with the H position data, the V position data, the attribute data and the name data of the object data outputted from the OAM 38, respectively in response to the load signal outputted from the register control circuit 74. The H position data latched in the H-position register 66 is supplied to the H position arithmetic circuit 64. If the most significant bit of the H position data is of "0", then the H position arithmetic circuit 64 supplies "0" to the size counter 60. If the most significant bit of the H position data is of "1", then the H position arithmetic circuit 64 supplies data D3 to D5 of the "2"s complement (absolute value) data of the H position to the size counter 60. The data supplied to the size counter 60 in this way are used to determine from which character units (one character unit corresponds to 8 bits) of an object as seen from the left side in the horizontal direction should be displayed on the screen of the monitor 22. When the H position of an object is represented by "504" (1F8H=−8), for example, the "2"s complement is of "8". Thus, each of the data D3 to D5 of the 2s complement data is of "1". This means that the object is displayed on the screen of the monitor 22 from the first character unit constituting the object. However, the display of the object starts from the 0th character, and hence the first character corresponds to the second character as seen from the left side.

Immediately after a start in the horizontal blanking period, the size counter control circuit 62 receives the signal HBH from the timing signal generating circuit 34 so as to supply a load signal /LD to the size counter 60.

The size counter 60 is responsive to the load signal /LD of the size counter control circuit 62 so that "0" is preset thereto when the H position of an object is represented in the range of "0–255" and the data fed from the H position arithmetic circuit 64 is preset thereto when the H position is in the range of "256–511".

The data of the size counter 60 is delivered to the H position arithmetic circuit 64. The H position arithmetic circuit 64 converts a mode for performing an arithmetic operation on the "2"s complement into an adder mode in response to the signals HCO and IN outputted from the timing signal generating circuit 34. Under such an adder mode, the H position data and the data outputted from the size counter 60 are added together. Then, the result of its addition corresponds to H position data which takes the size of the object in the horizontal direction into consideration, and represents H position data corrected at the time that character data of 8 dots are written into the buffer RAM 84 by the number of times corresponding to the number of characters in the horizontal direction. In addition, the result of its addition is supplied to the buffer RAM address circuit 90 as address data. At the same time, the data outputted from the size counter 60 is delivered to the address adder control circuit 78 and used to determine addresses of an object, i.e., characters to be displayed.

The V position arithmetic circuit 76 subtracts the V position data of each object which is latched in the V-position register 68 from data about each line number represented by the signal V outputted from the timing signal generating circuit 34, and then supplies the result of its subtraction to the address adder control circuit 78.

The address adder control circuit 78 selects either data D0 to D5 indicative of the results of subtraction by the V position arithmetic circuit 76 or D0 to D4+the signal FIELD outputted from the timing signal generating circuit 34 in accordance with either "1" or "0" indicative of the data OBJ V SEL of the interlace register 54.

If the latter is selected by the address adder control circuit 78, then one line makes a graphic representation of one dot in the vertical direction. If the former is selected by the address adder control circuit 78, two lines makes a graphic representation of one dot in the vertical direction.

The size data loaded into the size register 50 are decoded by the size decoder 52 into the signals /OBJ8, /OBJ16, /OBJ32 or /OBJ64.

Only necessary bits, which take the size of the object into consideration, of the data selected by the address adder control circuit 78 as described above are inverted or made noninverse in the address adder control circuit 78 based on the data V-FLIP outputted from the attribute register 70 and the signals /OBJ8, /OBJ16, /OBJ32 or /OBJ64 outputted from the inrange detection circuit 56. As a result, A0 to A2, AA4 to AA6, AA8 to AA10 and AA12 to AA13 (see FIG. 17) are outputted to the address adder 80. At the same time, the address adder control circuit 78 receives the data from the size counter 60 so as to invert or make noninverse only necessary bits of the above data, which take the size of the object into consideration, in accordance with the data H-FLIP fed from the attribute register 70 and the signals /OBJ8, /OBJ16, /OBJ32 or /OBJ64 outputted from the inrange detection circuit 56. Thereafter, the address adder control circuit 78 supplies its result to the address adder 80. Further, the address adder control circuit 78 receives the most significant bit of the name register 72 and bank data indicative of an object's name in the size register 50 so as to perform address conversion, and thereafter supplies the result of the address conversion by the address adder control circuit 78 to the address adder 80.

The address adder 80 adds rightmost bits of H arithmetic data and V arithmetic data fed from the address adder control circuit 78 after the H inversion and/or V inversion are carried out and name data outputted from the name register 72, and at the same time adds leftmost bits of the H and V arithmetic data and object base data BASE fed from the size register 50, and thereafter supplies the result of its addition to the video data memory/address circuit 82 as an address.

The video data memory/address circuit 80 receives the signal OAE used to permit the output of each address to the video data memory 16, from the timing signal generating circuit 34 so as to output each address of the address adder 80 to the video data memory 16.

The video data memory 16 receives an address from the video data memory/address circuit 82 so as to supply graphic data to the H flip circuit 86.

The H flip circuit 86 inverts or makes noninverse graphic data of 8 dots in accordance with either "0" or "1" of the data H-FLIP outputted from the attribute register 70 so as to be supplied to the color data extraction circuit 88.

On the other hand, each address fed from the H position arithmetic circuit 64 is preset to the counter 340 (see FIG. 22) in the buffer RAM address circuit 90, and the data outputted from the counter 340 are supplied to the buffer RAM 84. In addition, the most significant bit of the H position data in the H-position register 66 and the carry signal (a carry at the time that each address of the buffer RAM is calculated) outputted from the H position arithmetic circuit 64 are electrically processed by the exclusive OR gate 404 (see FIG. 22) in the buffer RAM control circuit 92, and the result thus processed is also preset to the counter 340. If the carry signal is of "0" and the H position is in the range of "256–511", then the output of the exclusive OR gate 404 becomes "0". The data as the output of the exclusive OR gate 404 in the buffer RAM control circuit 92 is used to generate a write signal delivered to the buffer RAM 84.

The buffer RAM control circuit 92 receives the output from the exclusive OR gate 404 so as to supply either the write signal /WE0 or /WE1 to the buffer RAM 84 when the color of a dot designated by the color data extraction circuit 88 is not a code indicative of transparence.

When the display of an object on the screen starts from odd-numbered dots, the full adder 396 (see FIG. 22) in the buffer RAM control circuit 92 increments a buffer RAM address by "+1", and the result of its increment is supplied to the buffer RAM 84.

The buffer RAM 84 receives each address outputted from the buffer RAM address circuit 90, the color data fed from the color data extraction circuit 88, the color data and priority data outputted from the attribute register 70, and the write signals and each address outputted from the buffer RAM control circuit 92 so as to store therein both color data and priority data of 9 bits in total.

In the illustrated embodiment, the buffer RAM 84, uses two RAMs of 128×9 bits (i.e., 128 by 9 bits). One of the two RAMs is used to store data of odd-numbered dots therein, whereas the other thereof is used to store data of even-numbered dots therein. It is therefore necessary to provide two kinds of addresses in the present embodiment. However, only one kind of address may be used if the response speed of each of the first and second buffer RAMs 84a and 84b (see FIG. 21) is increased. In this case, the address to be outputted from the buffer RAM control circuit 92 is unnecessary.

When the size of an object is of 8×8 or greater, i.e., when the object is made up of two or more characters, the size counter 60 is counted up, and thereafter the above-described operation is repeated by the number of times corresponding to the number of the characters referred to above.

The size counter control circuit 62 makes a decision as to the timing for completing the transfer of each object data to the buffer RAM 84 using the signals /OBJ8, /OBJ16, /OBJ32 or /OBJ64 outputted from the inrange detection circuit 56 and each value counted by the size counter 60. Each of addresses in the vector RAM address circuit 58 is prohibited from being counted down (decremented) until a plurality of character data constituting one object are all written into the buffer RAM 84. The address of the vector RAM address circuit 58 is decremented by "−1" at the above timing for writing all the character data into the buffer RAM 84. In this way, the vector RAM address circuit 58 supplies a vector RAM address at which OAM address data of the next object is stored, to the vector RAM 46. The data outputted from the vector RAM 46 is supplied to the OAM 38, and the H position data outputted from the OAM 38 is supplied via the H-position register 66 to the H position arithmetic circuit 64. Then, horizontally display-start position data of the next object is supplied again to the size counter 60 from the H position arithmetic circuit 64. In addition, the load signal is delivered to the size counter 60 from the size counter control circuit 62, thereby presetting the size counter 60.

Similarly, object data of subsequent respective objects are hereafter stored in the buffer RAM 84.

Horizontal Scanning Period II

During the horizontal scanning period, the data in the buffer RAM 84 is converted into an image signal so as to be supplied to the RGB monitor 22 (see FIG. 1).

Upon completion of the horizontal blanking period, the buffer RAM address circuit 90 receives the signal /CRES from the timing signal generating circuit 34 so as to reset the counter 340 provided inside the buffer RAM address circuit 90.

During the horizontal scanning period, the buffer RAM 84 receives each address from the buffer RAM address circuit 90 so as to generate graphic data, thereby outputting the same to the composition circuit 28. The graphic data of the object combined with the background pattern in the composition circuit 28 is converted into an image signal by the image signal generating circuit 30. Thus, an image obtained by combining the object and the background pattern is displayed on the screen of the monitor 22.

In the buffer RAM address circuit 90, the counter 340 is counted up in response to the signal HCO outputted from the timing signal generating circuit 34, thereby sequentially incrementing each of the addresses. In addition, the buffer RAM 84 is activated to receive addresses from the buffer RAM address circuit 90 so as to generate graphic data, which are sequentially supplied to the composition circuit 28.

Data for a line presently being scanned are outputted from the buffer RAM 84, and at the same time the operation previously described [in the "HORIZONTAL SCANNING PERIOD I] is executed again to create data of the next line.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A moving picture display apparatus of a type wherein a large-sized object can be displayed on a raster-scan type monitor by combining one or more characters each comprising a plurality of dots in horizontal and vertical directions respectively, said moving picture display apparatus comprising:

a first storing device coupled to said monitor for previously storing graphic data of said characters constituting an object in a corresponding address region for each object;

an object designation data element for outputting object designation data used to designate at least one said object to be displayed on said monitor during the next vertical scanning period on said monitor;

a position indicating element for outputting position data used to represent horizontal and vertical positions of said designated object on said monitor on which said designated object is to be displayed;

a size determination data device for outputting size determination data for determining the number of characters constituting an object;

a second storage device for temporarily storing said object designation data and said position data therein;

logic circuitry for logically combining vertical position data read from said second storage device, horizontal position data read from said second storage device, size determination data outputted from said size determination data device and a horizontal line number for determining whether the object is vertically and horizontally in an inrange state and capable of being displayed on said monitor during the next horizontal scanning period; and read address creating circuitry for creating a read address for said first storage device with respect to an object being determined to be in said inrange state by said logic circuitry, and in response to said object designation data, said position data and said size determination data, thereby applying the so-created read address to said first storage device.

2. A moving picture display apparatus according to claim 1, wherein said size determination data device includes a size selection data element for outputting data used to select an object size for each object and a size designation data element for outputting size designation data used to designate the size of the object for each screen of said monitor, and said read address creating circuitry is activated to create said read address with respect to the object subjected to the determination of said object being in the inrange state by said logic circuitry, in response to data obtained by combining said size selection data and said size designation data, said object designation data and said position data.

3. A moving picture display apparatus according to claim 2, wherein said size designation data outputting element includes a storage element for temporarily storing therein said size designation data generated for each screen of said monitor.

4. A moving picture display apparatus according to claim 1, wherein said size determination data device includes a third storage device for previously storing therein size selection data used to select the object size for each object and size designation data used to designate the size of the object for each screen of said monitor, circuitry for reading said size designation data stored in said third storage device for each screen and each size selection data stored therein for each object and an element for temporarily selecting therein said size designation data read by said reading circuitry, and said logic circuitry is activated to make a determination as to whether or not the object is in an inrange state, based on the combination of said size selection data and said size designation data.

5. An external memory detachably mounted on a moving picture display apparatus which is used to display a large-sized object on a raster-scan type monitor by combining one or more characters each comprising a plurality of dots in horizontal and vertical directions respectively and which apparatus includes a first storage device coupled to said monitor for storing graphic data of said characters constituting an object in a corresponding address region for each object, said external memory comprising:

an object designation data element for outputting object designation data used to designate at least one said object to be displayed on said monitor during the next vertical scanning period on said monitor;

a position data element for outputting position data used to represent horizontal and vertical positions of said designated object on said monitor on which said designated object is to be displayed; and a size determination data device for outputting said determination data used to variably determine the size of an object; said moving picture display apparatus further comprising:

a second storage device for temporarily storing said object designation data and said position data therein;

logic circuitry for logically combining vertical position data read from said second storage device, horizontal position data read from said second storage device, size determination data outputted from said size determination data device and a horizontal line number for determining whether the object is vertically and horizontally in an inrange state and capable of being displayed on said monitor during the next horizontal scanning period; and read address creating circuitry for creating a read address for said first storage device with respect to an object being determined to be in said inrange state by said logic circuitry, and in response to said object designation data, said position data and said size determination data, thereby applying the so-created read address to said first storage device.

6. A moving picture display apparatus of a type wherein a large-sized object can be displayed on a raster-scan type monitor by combining one or more characters each comprising a plurality of dots in horizontal and vertical directions respectively, said moving picture display apparatus comprising:

first storing means coupled to said monitor for previously storing graphic data of said characters constituting an object in a corresponding address region for each object;

object designation data means for outputting object designation data used to designate at least one said object to be displayed on said monitor during the next vertical scanning period on said monitor;

position data means for outputting position data used to represent positions of said designated object on said monitor on which said designated object is to be displayed;

size selection data means for outputting data for selecting an object size for each said object;

designation mode data means for outputting designation mode data used to determine a size designation mode for each screen of said monitor;

second storing means for temporarily storing said object designation data and said position data therein, said position including vertical position data and horizontal position data;

logic circuitry for logically combining vertical position data read from said second storing means, horizontal position data read from said second storing means, size selection data outputted from said size selection data means, and designation mode data outputted from said designation mode data means for determining whether the object is vertically and horizontally in an inrange state and capable of being displayed on said monitor during a horizontal scanning period; and read address creating means for creating a read address for said first storing means with respect to an object being determined to be in said inrange state by said logic circuitry so as to supply the so-created read address to said first storing means.

7. A moving picture display apparatus according to claim 6, further comprising means for temporarily storing said size selection data therein.

8. An external memory detachably mounted on a moving picture display apparatus which is used to display a large-sized object on a raster-scan type monitor by combining one or more characters each comprising a plurality of dots in horizontal and vertical directions respectively and which apparatus includes first storing means coupled to said monitor for storing graphic data of said characters constituting an object in a corresponding address region for each object, said external memory comprising:

object designation data means for outputting object designation data used to designate at least one object to be displayed on said monitor during the next vertical scanning period on said monitor;

position data means for outputting position data used to represent positions of said designated object on said monitor on which said designated object is to be displayed;

size selection data means for outputting data for selecting the number of characters constituting each object; and designation mode data means for outputting designation mode data used to determine a size designation mode for each screen of said monitor; said moving picture display apparatus further comprising;

second storing means for temporarily storing said object designation data and said position data therein;

logic circuitry for logically combining vertical position data read from said second storing means, horizontal position data read from said second storing means, size selection data outputted from said size selection data means, designation mode data outputted from said designation mode data means and a horizontal line number for determining whether the object is vertically and horizontally in an inrange state and capable of being displayed on said monitor during the next horizontal scanning period; and read address creating means for creating a read address for said first storing means with respect to an object being determined to be in said inrange state by said logic circuitry so as to supply the so-created read address to said first storing means.

9. A moving picture display apparatus of a type wherein a large-sized object can be displayed on a raster-scan type monitor by combining one or more characters each comprising a plurality of dots in horizontal and vertical directions respectively, said moving picture display apparatus comprising:

first storing means coupled to said monitor for previously storing graphic data of said characters constituting an object in a corresponding address region for each object;

object designation data means for outputting object designation data used to designate at least one said object to be displayed on said monitor during the next vertical scanning period on said monitor;

position data means for outputting position data used to represent positions of said designated object on said monitor on which said designated object is to be displayed;

size determination data means for outputting size determination data used to decide the size of an object;

second storing means for temporarily storing said object designation data and said position data therein, said position data including vertical position data and horizontal position data;

logic circuitry for logically combining position data read from said second storing means, and size determination data fed from said size determination means for determining whether or not the object is an inrange state and capable of being displayed on said monitor during a horizontal scanning period;

means for reading graphic data from said first storing means with respect to an object being determined to be in said inrange state by said logic circuitry;

means for determining whether or not some of the object determined to be in said inrange state by said logic circuitry lies over the range of the screen of said monitor and is in an over-range state; and read inhibiting means for inhibiting said graphic data of some of the object subjected to the determination of said object lying beyond said screen by said means for determining an over-range state from being read from said first storing means.

10. A moving picture display apparatus according to claim 9, wherein said means for determining an over-range state includes left-end determining means for making a decision as to whether the object lies outside from the horizontal-extending left end of the screen, and said inhibiting means includes setting means for setting a start address used to read graphic data of the object when it is detected that the object lies outside from the left end thereof, to graphic data of actually-displayed characters, thereby inhibiting the reading of graphic data of characters which lie beyond the left end thereof.

11. A moving picture display apparatus according to claim 9, wherein said means for determining an over-range state includes right-end determining means for making a decision as to whether or not the object lies beyond a horizontally-extending right end of the screen.

12. A moving picture display method for displaying a large-sized object on a raster-scan type monitor for combining one or more characters each comprising a plurality of dots in horizontal and vertical directions respectively, said moving picture display method comprising:

storing graphic data of said characters constituting an object in a corresponding address for each object, said graphic data being stored in advance of displaying an object;

outputting object designation data used to designate at least one said object to be displayed on said monitor during a next vertical scanning period on said monitor;

outputting position data used to represent positions of said designated object on said monitor on which said designated object is to be displayed;

outputting size determination data used to decide the size of an object;

temporarily storing said object designation data and said position data therein, said position data including vertical position data and horizontal position data;

logically combining position data and size determination data for determining whether or not the object is in an inrange state and capable of being displayed on said monitor during a horizontal scanning period;

reading said graphic data with respect to an object being determined to be in said inrange state;

determining whether or not some of the object determined to be in said inrange state lies over the range of the screen of said monitor and is in an over-range state; and inhibiting said graphic data of some of the object subjected to the determination of said object lying beyond said screen from being read.

13. A moving picture display method according to claim 12, wherein said determining an over-range state includes making a decision as to whether the object lies outside from the horizontal-extending left end of the screen, and setting a start address used to read graphic data of the object when it is detected that the object lies outside from the left end thereof, to graphic data of actually-displayed characters, thereby inhibiting the reading of graphic data of characters which lie beyond the left end thereof.

14. A moving picture display method according to claim 12, wherein said determining an over-range state includes making a decision as to whether or not the object lies beyond a horizontally-extending right end of the screen.

\* \* \* \* \*